US009565287B2

(12) United States Patent
Nishikawa

(10) Patent No.: US 9,565,287 B2
(45) Date of Patent: Feb. 7, 2017

(54) REMOTE CONTROL METHOD AND REMOTE CONTROL SYSTEM

(71) Applicant: Panasonic Intellectual Property Corporation of America, Torrance, CA (US)

(72) Inventor: Takayuki Nishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/936,723

(22) Filed: Nov. 10, 2015

(65) Prior Publication Data

US 2016/0156766 A1 Jun. 2, 2016

(30) Foreign Application Priority Data

Nov. 28, 2014 (JP) ................................. 2014-241386
Jul. 24, 2015 (JP) ................................. 2015-146994

(51) Int. Cl.
*H04M 3/00* (2006.01)
*H04M 1/725* (2006.01)
*H04L 12/28* (2006.01)

(52) U.S. Cl.
CPC ...... *H04M 1/72533* (2013.01); *H04L 12/2803* (2013.01); *H04L 12/2807* (2013.01); *H04L 12/2816* (2013.01); *H04L 12/2825* (2013.01)

(58) Field of Classification Search
CPC ............ H04M 1/72533; H04L 12/2807; H04L 12/2803; H04L 12/2816; H04L 12/2825

USPC .............................. 455/420, 419, 418, 550.1
See application file for complete search history.

(56) References Cited

U.S. PATENT DOCUMENTS

| | | | | |
|---|---|---|---|---|
| 8,224,491 | B2* | 7/2012 | Koster | F24F 11/006 236/51 |
| 8,350,694 | B1* | 1/2013 | Trundle | G08B 25/08 340/539.11 |
| 2010/0289644 | A1* | 11/2010 | Slavin | G08B 13/2402 340/568.1 |
| 2013/0059654 | A1* | 3/2013 | Oh | A63F 13/77 463/29 |
| 2014/0148147 | A1* | 5/2014 | Tak | H04M 1/72533 455/420 |
| 2014/0244834 | A1* | 8/2014 | Guedalia | H04L 67/16 709/224 |
| 2014/0266669 | A1* | 9/2014 | Fadell | G05B 19/042 340/501 |

FOREIGN PATENT DOCUMENTS

JP 2002-291057 10/2002

* cited by examiner

*Primary Examiner* — Khai M Nguyen
(74) *Attorney, Agent, or Firm* — Greenblum & Bernstein, P.L.C.

(57) ABSTRACT

A notification to prompt a user granted a remote control right to remote control a device is transmitted to the user. In such a case, if the user has not performed any operation on the device for a predetermined period of time, another user is temporarily granted the remote control right to the device. A notification to prompt the other user temporarily granted the remote control right is also transmitted to the other user.

22 Claims, 14 Drawing Sheets

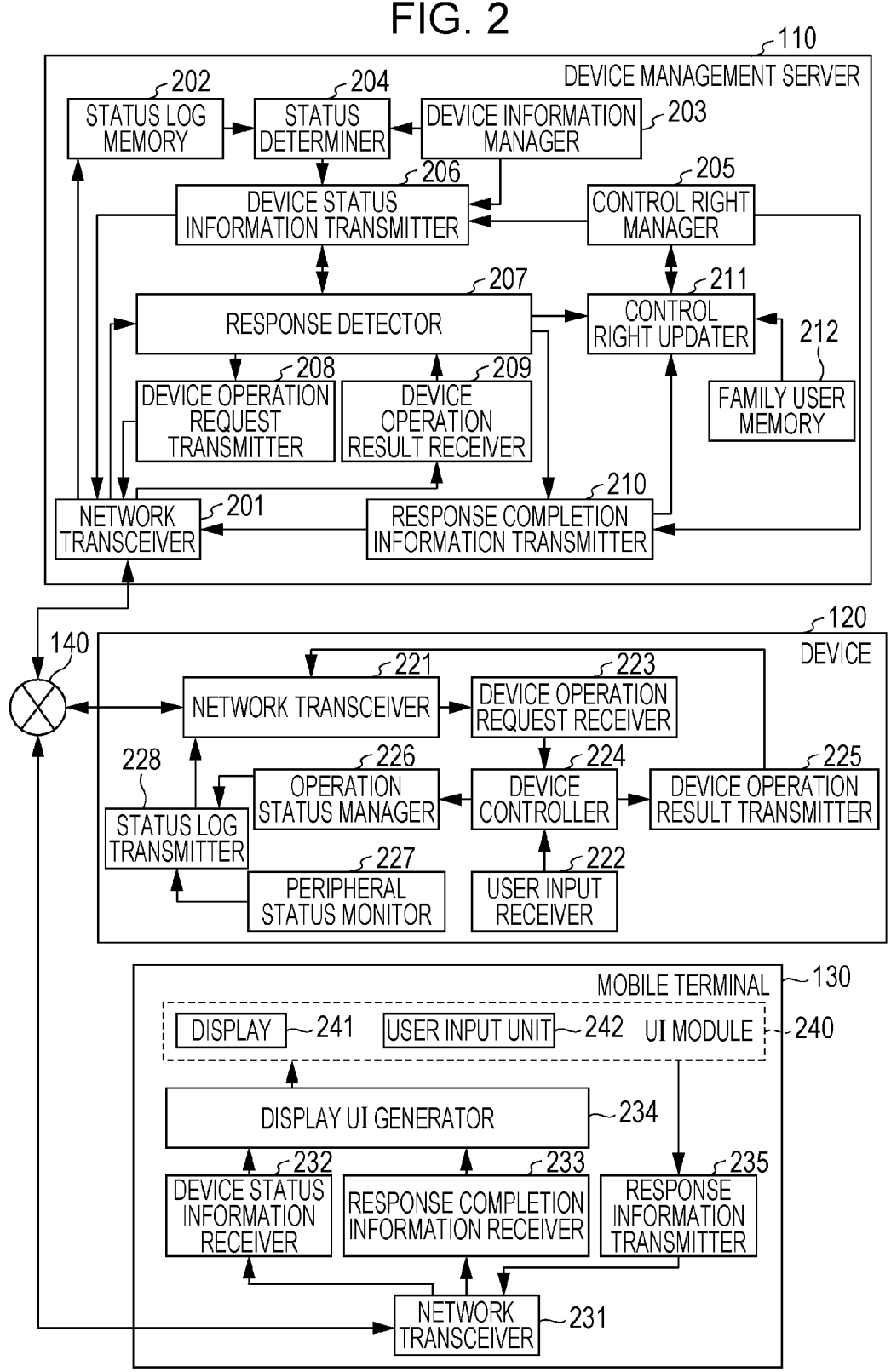

| TIME STAMP | DEVICE ID | OPERATION STATUS | SET TEMPERATURE | ROOM TEMPERATURE | ROOM STAY STATUS | POWER FAILURE DETECTED |
|---|---|---|---|---|---|---|
| 2014004090000 | 120a | ON | 28°C | 30°C | IN | NO |

| TIME STAMP | DEVICE ID | OPERATION STATUS | SET TEMPERATURE | ROOM TEMPERATURE | ROOM STAY STATUS | POWER FAILURE DETECTED |
|---|---|---|---|---|---|---|
| ⋮ | ⋮ | ⋮ | ⋮ | ⋮ | ⋮ | ⋮ |
| 2014004090000 | 120a | ON | 28°C | 30°C | IN | NO |
| 2014004090100 | 120a | ON | 28°C | 30°C | OUT | NO |
| 2014004090200 | 120a | ON | 28°C | 29°C | OUT | NO |
| ⋮ | ⋮ | ⋮ | ⋮ | ⋮ | ⋮ | ⋮ |

| 411 | 412 | 413 | 414 |
|---|---|---|---|
| DEVICE ID | TYPE | MODEL | INSTALLATION LOCATION |
| 120a | AIR-CONDITIONER | 120A | BEDROOM |
| 120b | LIGHTING | 120B | BEDROOM |
| 120c | AIR-CONDITIONER | 120C | LIVING ROOM |
| 120d | AIR-CONDITIONER | 120D | CHILD'S ROOM |
| ⋮ | ⋮ | ⋮ | ⋮ |

FIG. 4B
450

| 461 | 462 | 463 | 464 | 465 |
|---|---|---|---|---|
| MODEL | STATUS | DETERMINATION CONDITIONS | NECESSITY OF NOTIFICATION | RECOMMENDED RESPONSE OPERATION |
| 120A | NO PERSON CONTINUOUSLY PRESENT FOR LONG PERIOD OF TIME WITH POWER ON | NO PERSON CONTINUOUSLY PRESENT FOR 30 MINUTES OR LONGER WITH POWER ON | YES | POWER: OFF |
| 120A | HIGH TEMPERATURE CONTINUING SUBSEQUENT TO POWER FAILURE | POWER FAILURE DETECTED AND ROOM TEMPERATURE OF 28°C CONTINUING FOR 1 HOUR OR LONGER | YES | POWER: ON, OPERATION MODE: COOLING |
| ⋮ | ⋮ | ⋮ | ⋮ | ⋮ |

FIG. 5A
500a

| DEVICE ID (511) | USER ID (512) | TERMINAL ID (513) | CONTROL RIGHT (514) |
|---|---|---|---|
| 120a | 501a | 130a | STANDARD |
| 120a | 501b | 130b | STANDARD |
| 120a | 501c | 130c | TEMPORARY |

(rows 1-2: a; row 3: b)

FIG. 5B
500b

| DEVICE ID (511) | USER ID (512) | TERMINAL ID (513) | CONTROL RIGHT (514) |
|---|---|---|---|
| 120a | 501a | 130a | STANDARD |
| 120a | 501b | 130b | STANDARD |

FIG. 6
600

| 611 | 612 | 613 | 614 | 615 | 616 | 617 |
|---|---|---|---|---|---|---|
| DEVICE ID | STATUS | INSTALLATION LOCATION | RECOMMENDED RESPONSE OPERATION | CONTROL RIGHT | NOTIFIED USER ID | RESPONSE STATUS |
| 120a | WITH NO PERSON CONTINUOUSLY PRESENT FOR LONG PERIOD OF TIME WITH POWER ON | BEDROOM | POWER OFF | STANDARD | 501a 501b | NOT YET |

FIG. 7
700

| 711 | 712 | 713 |
|---|---|---|
| DEVICE ID | USER ID | REQUESTED OPERATION |
| 120a | 501a | POWER OFF |

FIG. 8
800

| 811 | 812 | 813 | 814 |
|---|---|---|---|
| DEVICE ID | STATUS | RESPONSE USER ID | RESPONSE OPERATION |
| 120a | NO PERSON CONTINUOUSLY PRESENT WITH POWER ON | 501a | POWER OFF |

FIG. 9
900

| 911 | 912 |
|---|---|
| FAMILY USER ID | TERMINAL ID |
| 501a | 130a |
| 501b | 130b |
| 501c | 130c |

FIG. 15A
1500

| TIME STAMP (1511) | DEVICE ID (1512) | USER ID (1513) | OPERATION (1514) |
|---|---|---|---|
| 20141004200000 | 120a | 501a | POWER ON |

FIG. 15B
1550

| TIME STAMP (1561) | DEVICE ID (1562) | USER ID (1563) | OPERATION (1564) |
|---|---|---|---|
| 20140801120000 | 120c | 501a | POWER OFF |
| ⋮ | ⋮ | ⋮ | ⋮ |
| 20140804200000 | 120a | 501a | POWER ON |
| 20140804201000 | 120b | 501z | POWER ON |
| ⋮ | ⋮ | ⋮ | ⋮ |
| 20140804230000 | 120b | 501z | POWER OFF |
| ⋮ | ⋮ | ⋮ | ⋮ |
| 20140807090100 | 120a | 501b | POWER OFF |
| 20140807090100 | 120c | 501b | POWER OFF |
| 20140807090100 | 120d | 501b | POWER OFF |
| ⋮ | ⋮ | ⋮ | ⋮ |
| 20140808120000 | 120d | 501c | POWER ON |
| 20140808120100 | 120c | 501c | POWER OFF |

REMOTE CONTROL METHOD AND REMOTE CONTROL SYSTEM

BACKGROUND

1. Technical Field

The present disclosure relates to a remote control method and a remote control system to remote control a device connected a network.

2. Description of the Related Art

Some devices installed at home, such as air-conditioners and electronic locks, may be connected to a network, and have a function of communicating with another device via the network.

Remote control systems that remote control the device having such a function using a mobile terminal or the like are also available.

In such a remote control system, a user granted a remote control right of the device in advance remote controls the device using a predetermined mobile terminal and receives, via the mobile terminal, information indicating a state of the device or a state surrounding the device (hereinafter referred to as a "use state of the device") detected by the device.

At a remote location, for example, the user may be notified of information related to the use state of the device installed at home via the mobile terminal carried by the user. If the user decides to perform a new operation on the device, he or she may remote control the device at the remote location using the mobile terminal.

Japanese Unexamined Patent Application Publication No. 2002-291057 discloses a remote control system. In accordance with the disclosed remote control system, for the security reason, a device to be remote controlled performs a process responsive to a remote control operation that is performed using a predetermined mobile terminal by a user who is granted the remote control right to the device.

The user granted the remote control right of the device may go out without carrying their own predetermined mobile terminal. Even if information related to the use state of the device that is to be notified to the user is transmitted to the mobile terminal in such a case, the user is not aware of the information at an outside location.

Even if the information transmitted to the mobile terminal includes information that prompts the user to perform an advisable operation on the device, the advisable operation is not performed by the user. As a result, a responding action to the use state of the device may be delayed.

SUMMARY

One non-limiting and exemplary embodiment provides a remote control method that reduces the possibility of delay in a response that is to be performed to the use state of a device detected by the device.

In one general aspect, the techniques disclosed here feature a remote control method. The remote control method that remote controls a target device connected to a network in a system by using a mobile terminal, includes acquiring, from the target device, status information indicating a use state of the target device, deciding to transmit recommendation information prompting a user to switch the target device in the use state from a first use state to a second use state to a first mobile terminal to be used by a first user who is granted a remote control right to the target device from among a plurality of users, based on the status information, and a database storing association information indicating an association between the users and mobile terminals respectively used by the users, and right information that indicates for each of the users whether the user is granted the remote control right to the target device, transmitting the recommendation information to the first mobile terminal, determining whether the target device is switched in the use state from the first use state after the recommendation information is transmitted to the first mobile terminal, updating the database such that the remote control right to a second user who has not been granted the remote control right from among the users is granted if the first use state is determined to remain unchanged for a predetermined period of time from the transmission of the recommendation information to the first mobile terminal, deciding to transmit the recommendation information to a second mobile terminal used by the second user in accordance with the updated database, and transmitting the recommendation information to the second mobile terminal. These general and specific aspects may be implemented using a system, a method, and a computer program, and any combination of systems, methods, and computer programs.

The recommendation information may be transmitted to the first mobile terminal used by the first user who is granted the remote control right to the target device in advance. If the target device has not been switched from the first use state for a predetermined period of time, the second user is newly granted the remote control right to the target device, and the recommendation information is then transmitted to the second mobile terminal used by the second user.

If the use state is detected by the device but a responding action is not taken on the use state of the device regardless of the time elapse of the predetermined period of time from the transmission of the recommendation information to the first user, the first user as well as the second user may respond to the use state of the device.

The remote control method thus reduces the possibility of delay in the response to the use state detected and performed by the device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a functional block diagram of a device management server, a device, and a mobile terminal;

FIG. 3A illustrates a data structure of a status log;

FIG. 3B illustrates a data structure of a status log table;

FIG. 4A illustrates a data structure of device information;

FIG. 4B illustrates a data structure of device state determination information;

FIG. 5A illustrates a data structure of control right information;

FIG. 5B illustrates a data structure of control right information;

FIG. 6 illustrates a data structure of device status information;

FIG. 7 illustrates a data structure of response information;

FIG. 8 illustrates a data structure of response completion information;

FIG. 9 illustrates a data structure of family user information;

FIG. 15A illustrates a data structure of an operation log;

FIG. 15B illustrates a data structure of an operation log table; and

DETAILED DESCRIPTION

Figure 1:
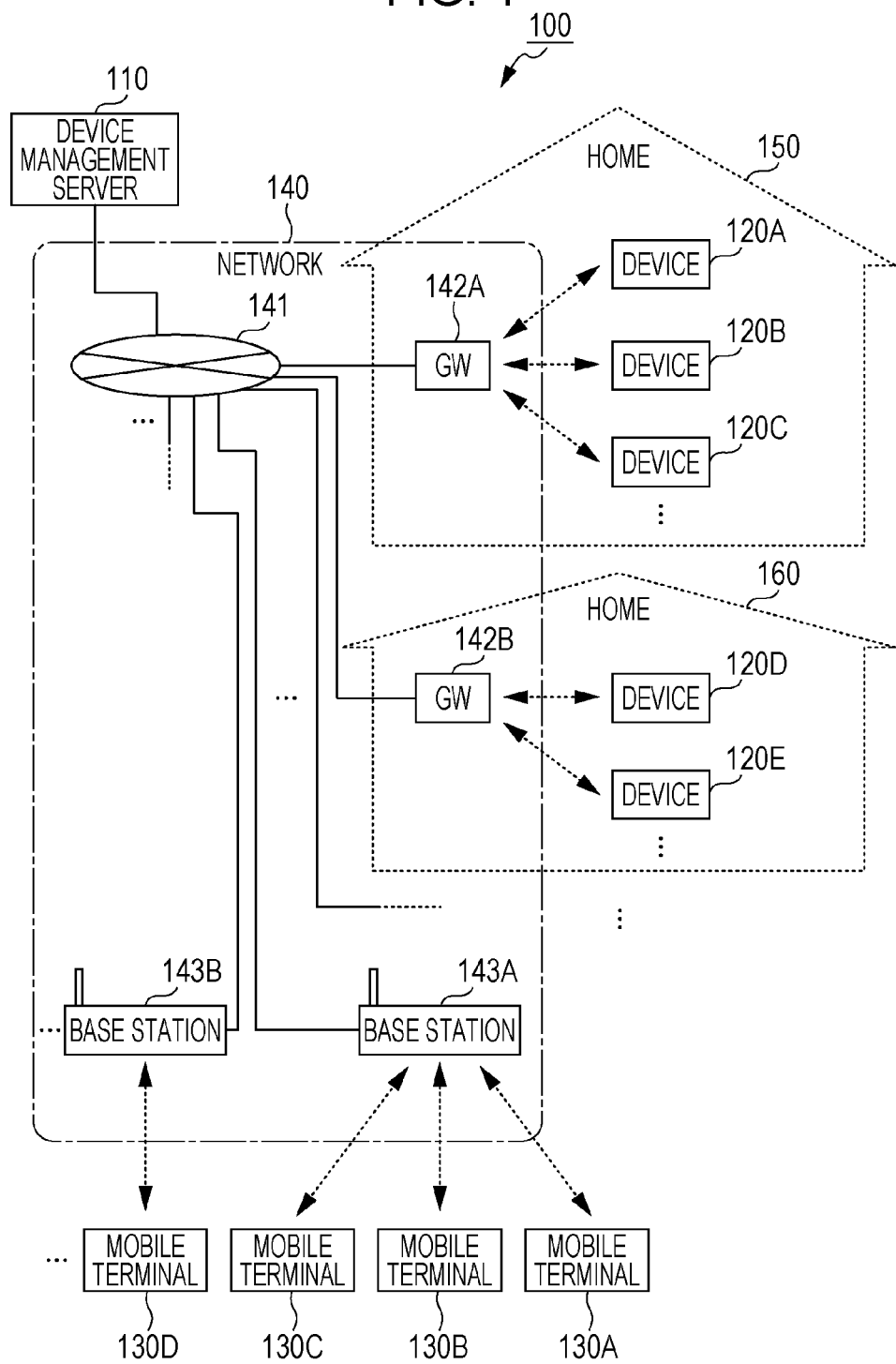
FIG. 1 illustrates a system configuration of a remote control system.

Underlying Knowledge Forming Basis of the Present Disclosure

More and more network-supporting home appliances have been linked to a local area network (LAN) or the Internet recently. With a home appliance connected to the network, the user may control the home appliance from or outside home using a mobile terminal, such as a smart phone or a personal computer. For example, the user may start a home air-conditioner from outside the home before arriving at home using the smart phone. The home air-conditioner may thus be adjusted as desired by the user, and enjoy air-conditioning immediately when the user arrives at home.

The network-supporting home appliance not only performs a control command transmitted from the user via the mobile terminal, but also transmits information detected thereby to the mobile terminal of the user. For example, if a home air-conditioner detects the continuous operation thereof with nobody at home for 30 minutes or longer, the air conditioner may notify the mobile terminal of the user that the home air-conditioner has been operated with nobody at home for 30 minutes or longer. In this way, the user may control useless power consumption that may happen when the user forgets switching off the home air-conditioner.

As the network-supporting home appliances are in widespread use at many users' homes, the control right of the network-supporting home appliances at home is set. For example, home appliances on a parents' bedroom, such as a television, an air-conditioner, or a lighting device, may be properly set up to control an inappropriate access through the network by their child. To this end, the control right on the devices may be granted to the father or to the father and mother. On the other hand, an air-conditioner and a lighting device in a living room, and an electronic lock on the front door, typically used by all family members at home are set up so that each of the family members has the control right.

Techniques are available to set the control right on network-supporting home appliances. For example, Japanese Unexamined Patent Application Publication No. 2002-291057 discloses a technique related to a home control apparatus configured to control home electronics. According to the disclosed technique, a mobile terminal number, a password, and access right information that is a combination of control rights are pre-registered on the home control apparatus. When a mobile terminal sends a control request, the home control apparatus authenticates the mobile terminal. If the request has come from a registered user, the home control apparatus permits device control.

In this related art, information detected by a home appliance is notified to a notification destination that is specified and stored on an automatic notification destination memory. The information detected by the home appliance is not notified to any user other than a user set as a notification destination. If the user set as the notification destination does not recognize the information notified by the home appliance, no action may be taken in response to the information notified by the home appliance even if another family member is available to take action.

The father and mother may be granted the control right on an air-conditioner at the parents' bedroom, and that air-conditioner may be continuously operating with nobody in the bedroom for 30 minutes or longer. The air-conditioner thus notifies the mobile terminals of the parents having the control right that the air-conditioner has been operating for 30 minutes or longer. The father may currently be outside the service coverage area and the mother may go out with her mobile phone left home. One of their children may be available to power off the air-conditioner, but has no control right on the air-conditioner of the parents' bedroom. The child is unable to remote control the air-conditioner via a child's mobile terminal, and the information detected by the air-conditioner is not notified to that mobile terminal. As a result, none of the family members are able to power off the air-conditioner.

The inventor has recognized this problem, and has studied in detail a remote control method in a remote control system. Although a home appliance attempts to notify information to the user set as a notification destination, no operation is taken on the device for a predetermined period of time. In such a case, the inventor has found that the possibility of taking any kind of action to the home appliance is increased if the device attempts to notify the information detected thereby to a person other than the user set as the notification destination, and has thus reached the disclosure.

First Embodiment

Summary

A remote control system to implement a remote control method of the disclosure is described below. The remote control system includes multiple devices, multiple mobile terminals, and a device management server, interconnected via a network.

In the remote control system, devices are respectively installed at homes, periodically generate status logs by detecting the states of the devices and the states surrounding the devices, and transmit the generated status logs to the device management server.

Each time the device management server receives the status log from the device, the device management server saves the status log. Based on the periodically saved status logs and pre-saved device status determination information, the device management server determines whether the device as a transmission source of the status log is in a predetermined state that involves prompting the user of the device to remote control the device.

If the determination result is affirmative, the device management server transmits, to a mobile terminal of a user granted the remote control right to the device (hereinafter referred to as a "first user"), device status information prompting the first user to remote control the device.

The device management server determines whether the device as a target has been operated within a predetermined time elapse subsequent to the transmission of the device status information to the mobile terminal of the first user. If the determination result is non-affirmative, the device management server temporarily grants a user satisfying a predetermined condition other than the first user (hereinafter referred to as a "second user"), and then transmits the device status information to a mobile terminal of the second user.

Subsequent to the transmission of the device status information to the mobile terminal of the second user, the device management server determines whether the target device has been operated. If the determination result is affirmative, the device management server suspends the temporary grant of the remote control to the second user to the device, and then limits the user granted the remote control right to the device to the first user back again.

A remote control system 100 is described below with reference to the drawings.

Configuration

FIG. 1 illustrates a system configuration of the remote control system 100.

The remote control system 100 includes a device management server 110, devices 120A through 120E, mobile terminals 130A through 130D, and a network 140.

The network 140 includes the Internet 141, gateways (GWs) 142A and 142B, and base stations 143A and 143B.

Among these devices, the devices 120A through 120C and the gateway 142A are installed at a home 150, the devices 120D and 120E and the gateway 142B are installed at a home 160.

The devices 120A through 120E are home electronics having a communication capability, such as an air-conditioner, a washing machine, or a lighting device.

The devices 120A through 120C communicate with the gateway 142A in a wireless or wired fashion.

The devices 120D and 120E communicate with the gateway 142B in a wireless or wired fashion.

The gateways 142A and 142B are connected to the Internet 141.

The mobile terminals 130A through 130D may be mobile computer terminals having a communication capability, such as smart phones.

The mobile terminals 130A through 130C communicate with the base station 143A via a cellular phone network.

The mobile terminal 130D communicates with the base station 143B via the cellular phone network.

The base stations 143A and 143B are connected to the Internet 141.

The device management server 110 is a computer system having a communication capability, such as a workstation.

The device management server 110 is connected to the Internet 141.

In the discussion of the remote control system 100, the following rule applies to the reference numerals unless otherwise particularly specified. A virtual device 120 having a function common to the devices 120A through 120E is described instead of individually describing the function of each of the devices 120A through 120E. A virtual mobile terminal 130 having a function common to the mobile terminals 130A through 130D is described instead of individually describing the function of each of the mobile terminals 130A through 130D.

In the remote control system 100, the device management server 110, the device 120, and the mobile terminal 130 may mutually communicate with each other via the network 140.

The device management server 110, the device 120, and the mobile terminal 130 are described below in detail with reference to the drawings.

FIG. 2 is a functional block diagram illustrating the device management server 110, the device 120, and the mobile terminal 130.

The device 120 includes a network transceiver 221, a user input receiver 222, a device operation request receiver 223, a device controller 224, a device operation result transmitter 225, an operation status manager 226, a peripheral status monitor 227, and a status log transmitter 228. The device 120 has a function of receiving a device operation from the mobile terminal 130 via the device management server 110, and a function of transmitting to the device management server 110 information of an operation state and a peripheral state of the device 120.

The device 120 includes a processor, a memory, and the like (these units are not illustrated) as hardware, and implements the above-described elements when the processor executes a program stored on the memory.

The network transceiver 221 includes a communication unit that performs communication via wired local area network (LAN), a wireless LAN, Bluetooth (registered trademark), or a communication line using a cellular phone network, and exchanges data with an external device (such as the device management server 110, or the mobile terminal 130) via the network 140.

The user input receiver 222 includes a unit receiving an input operation by a user (such as a button, a key, or a switch on the device 120 or an infrared remote controller having a communication capability). In response to the input operation by the user, the user input receiver 222 notifies the device controller 224 of a device operation request indicated by the received input operation.

The device operation request receiver 223 receives the device operation request transmitted from the device management server 110, and notifies the device controller 224 of the received device operation request.

The device controller 224 receives the device operation request notified by the user input receiver 222 or the device operation request receiver 223, and controls the device 120 in accordance with the received device operation request.

The device 120 is thus controlled by the device operation request received by the device operation request receiver 223 or the device operation request indicated by an input operation that the user close to the device 120 has generated using a button on the device 120 or using the remote controller.

If the device 120 is an air-conditioner, control operation examples of the device 120 may include power on/off control, and performing temperature control.

Upon controlling the device 120, the device controller 224 notifies the device operation result transmitter 225 of the operation results indicating the results of the device control.

The device operation result transmitter 225 receives the operation results notified by the device controller 224, and transmits the received operation results to the device management server 110.

The operation status manager 226 manages information concerning operation information of the device 120. The information concerning the operation information is updated with the operation results of the device 120 by the device controller 224.

More specifically, if the device 120 is an air-conditioner, the operation status manager 226 manages information concerning a current power state, an operation mode, and a set temperature.

The peripheral status monitor 227 includes a variety of sensors, such as a temperature sensor, or a human sensor, and periodically monitors the state surrounding the device 120 using these sensors.

More specifically, if the device 120 is an air-conditioner, the peripheral status monitor 227 periodically monitors the current room temperature, and the presence or absence of a person within the room.

The status log transmitter 228 periodically generates the status log of the device 120, based on at least the operation status information of the operation information of the device 120 managed by the operation status manager 226, or the peripheral status information of the state surrounding the device 120 monitored by the peripheral status monitor 227. The status log transmitter 228 transmits the generated status log to the device management server 110.

FIG. 3A illustrates a data structure of a status log 300 as an example of the status log generated when the device 120 is an air-conditioner.

As illustrated in FIG. 3A, the status log 300 is data in a table format, and includes as records in an associated state, a time stamp 311, device identification (ID) 312, operation status 313, set temperature 314, room temperature 315, room stay status 316, and power failure detected 317.

The time stamp 311 is information indicating the time the status log 300 is generated.

The device ID 312 is an identifier identifying the device 120.

The operation status 313 is information indicating the operation status of the device 120 (air-conditioner) at the time the status log 300 is generated.

The set temperature 314 indicates a set temperature of the device 120 at the time the status log 300 is generated.

The room temperature 315 indicates a temperature surrounding the device 120 monitored by the device 120 at the time the status log 300 is generated, namely, indicates a room temperature.

The room stay status 316 is information that is monitored by the device 120, and indicates whether a person is present in an area surrounding the device 120, namely, in the room where the device 120 is installed at the time the status log 300 is generated.

The power failure detected 317 indicates whether the device 120 is suspended in operation or not because of a power failure after the latest power-on of the device 120.

The records in the status log 300 are described for exemplary purposes only, and do not necessarily have to be included as exactly listed. Another record example contemplated may be information indicating an operation mode of the device 120.

In the above discussion, the status log 300 is periodically transmitted to the device management server 110. The transmission of the status log 300 to the device management server 110 does not necessarily have to be performed periodically. For example, the transmission of the status log 300 to the device management server 110 may be triggered by a change in the operation status of the device 120, or a change in the peripheral status of the device 120.

Referring back to FIG. 2, the device management server 110, the device 120, and the mobile terminal 130 are further described.

The device management server 110 includes a network transceiver 201, a status log memory 202, a device information manager 203, a status determiner 204, a control right manager 205, a device status information transmitter 206, a response detector 207, a device operation request transmitter 208, a device operation result receiver 209, a response completion information transmitter 210, a control right updater 211, and a family user memory 212. The device management server 110 has seven functions as described below.

Function 1: Receiving and storing a status log transmitted from the device 120.

Function 2: Periodically determining whether each device 120 as a transmission source of the status log is in a predetermined state that involves prompting the user of the device 120 to remote control the device 120, based on the status log periodically saved and pre-saved device status determination information.

Function 3: Transmitting, to the mobile terminal 130 of the first user granted the remote control right on the device 120, the device status information prompting the first user to remote control the device 120 if the determination result is affirmative in function 2.

Function 4: Determining whether the device 120 is operated before the time elapse of a predetermined period of time subsequent to the transmission of the device status information to the mobile terminal 130 of the first user.

Function 5: Temporarily granting the second user satisfying a predetermined condition other than the first user the remote control right to the device 120 if the determination result is non-affirmative in function 4, and transmitting to the mobile terminal 130 of the second user the device status information prompting the second user to remote control the device 120.

Function 6: Determining whether the device 120 is operated subsequent to the transmission of the device status information to the mobile terminal 130 of the second user.

Function 7: Suspending the temporary control right to the device 120 granted to the second user if the determination result is affirmative in function 6, and limiting the user granted the remote control right to the device 120 to the first user.

The device management server 110 includes, as hardware, a processor, a memory, and the like (these elements are not illustrated), and implements the above-described elements when the processor executes a program stored on the memory.

The network transceiver 201 includes a communication interface to perform wired communications, and exchanges data with an external device (such as the device 120 or the mobile terminal 130) via the network 140.

The status log memory 202 saves the status log transmitted from the device 120. Each time the status log is received, the status log memory 202 updates and saves the status log table.

FIG. 3B illustrates a data structure of a status log table 350 as an example of the status log table to be saved on the status log memory 202.

As illustrated in FIG. 3B, the status log table 350 is an aggregate of past data of the status log 300 received in the past, and includes as records in an associated state, a time stamp 361, device identification (ID) 362, operation status 363, set temperature 364, room temperature 365, room stay status 366, and power failure detected 367.

The time stamp 361, the device ID 362, the operation status 363, the set temperature 364, the room temperature 365, the room stay status 366, and the power failure detected 367 are respectively similar to the time stamp 311, the device ID 312, the operation status 313, the set temperature 314, the room temperature 315, the room stay status 316, and the power failure detected 317 in the status log 300 of FIG. 3A. These records have been described.

Referring back to FIG. 2, the discussion of the device management server 110, the device 120, and the mobile terminal 130 continues.

The device information manager 203 manages the device information and the device status determination information related to each device 120 forming the remote control system 100. More specifically, the device information manager 203 updates the device information and the device status determination information as appropriate while saving these pieces of information.

FIG. 4A illustrates a data structure of device information 400 as an example of the device information managed by the device information manager 203.

As illustrated in FIG. 4A, the device information 400 includes, as records in an associated state, a device ID 411, type 412, model 413, and installation location 414.

The device ID 411 is an identifier identifying the device 120.

The type 412 indicates the type of the device 120 identified by the corresponding device ID 411.

The model 413 indicates the model of the device 120 identified by the corresponding device ID 411.

The installation location 414 indicates a location where the device 120 identified by the corresponding device ID 411 is installed.

FIG. 4B illustrates a data structure of device status determination information 450 as an example of the device status determination information managed by the device information manager 203.

As illustrated in FIG. 4B, the device status determination information 450 is data in a table format, and includes as records in an associated state a model 461, status 462, determination condition 463, necessity of notification 464 and recommended response operation 465.

The model 461 indicates a model of the device 120.

The status 462 indicates a state of the model of the device 120 indicated by the corresponding model 461.

The determination condition 463 indicates a condition that is to be satisfied to determine that the device 120 of the model indicated by the corresponding model 461 is in a state indicated by the corresponding status 462.

The necessity of notification 464 indicates whether to notify the user that the device 120 of the model indicated by the corresponding model 461 is in the state indicated by the corresponding status 462 if it is determined that the device 120 is in the state indicated by the corresponding status 462.

A specific example of the necessity of notification is that the determination condition 463 (with power on, and predetermined period of time with no person present) is satisfied when the device 120 is being operated for the predetermined period of time (30 minutes for example) or longer with no person present in the room (FIG. 4B) if the device 120 is an air-conditioner. To control unnecessary consumption of power, the notification to the user is to be performed. Another specific example of the necessity of notification is that the determination condition 463 (with power failure detected, and a temperature of 28° C. or higher continuously maintained for an hour or longer) is satisfied when the temperature of 28° C. continues for a hour or longer subsequent to the power failure in the room if the device 120 is an air-conditioner. The notification to the user is to be performed, for example, to save the life of a pet possibly weak to a high temperature environment kept in the room.

The necessity of notification 464 lists "yes" that indicates that the user is to be notified, and "no" that indicates that the notification to the user is not needed.

If the necessity of notification 464 indicates yes, the status 462 indicates to the user that the device 120 is in a predetermined state that prompts the user of the device 120 to remote control the device 120.

The recommended response operation 465 indicates a recommended response operation that is performed to the device 120 if it is determined that the device 120 of the model indicated by the corresponding model 461 is in the predetermined state indicated by the corresponding status 462.

Referring back to FIG. 2, the device management server 110, the device 120, and the mobile terminal 130 are continuously discussed below.

The status determiner 204 periodically determines the state of the device 120 in the remote control system 100 by referencing the status log table 350 stored on the status log memory 202, the device information 400 managed by the device information manager 203, and the device status determination information 450.

More specifically, if the contents of the status log table 350 satisfy the determination condition 463 of the device status determination information 450 in each device 120 forming the remote control system 100, the device 120 is determined to be in the corresponding status 462. If the determination condition 463 of the device status determination information 450 is not satisfied, the device 120 is determined not to be in the state indicated by the corresponding status 462.

If the device 120 as a target is currently determined to be in the state indicated by the status 462, and the necessity of notification 464 indicates the necessity of notification to the user, the status determiner 204 determines that the target device 120 is in the state that involves prompting the user of the device 120 to remote control the device 120. The status determiner 204 then notifies the device status information transmitter 206 of the device ID 411, the status 462, and the recommended response operation 465 of the target device 120.

The control right manager 205 manages the control right information of each device included in the remote control system 100.

FIG. 5A illustrates a data structure of control right information 500a as an example of the control right information managed by the control right manager 205.

As illustrated in FIG. 5A, the control right information 500a is data in a table format, and includes as records in an associated state a device ID 511, user ID 512, terminal ID 513, and control right 514.

The device ID 511 is an identifier identifying the device 120.

The user ID 512 is an identifier identifying a user who is granted the remote control right to the device 120 identified by the corresponding device ID 511.

The terminal ID 513 is an identifier identifying the mobile terminal 130 used by the user who is identified by the corresponding user ID. The terminal ID 513 is herein information indicating an address in communication via the network 140. An example of the address may be a mail address. However, as long as an address that uniquely identifies the mobile terminal 130, any address is possible and is not limited to the mail address.

The control right 514 indicates the type of the control right according to which the device 120 identified by the device ID 511 is remote controlled.

The control right includes two types, namely, "standard", and "temporary".

The type of the control right of the user that is granted the remote control right in a standard procedure is "standard" on the device 120 identified by the corresponding device ID 511.

The user granted the "standard" control right as the type of control right has all the remote control rights that may be performed on the target device 120.

A user who is not granted in advance the remote control right to the device 120 identified by the device ID 511, namely, who is not granted the "standard" control right at the type of the control right, may be currently temporarily granted the remote control right. The type of this control right to such a user is "temporary".

The user granted the "temporary" control right as the type of control right has some of all the remote control rights that may be performed on the target device 120.

The control right information is updated by the control right updater 211 as appropriate.

The control right information 500a of FIG. 5A is updated to include "standard" cells at the column of the control right 514 (rows labeled "a") with a "temporary" cell added at the column of the control right 514 (row labeled "b").

FIG. 5B illustrates a data structure of original control right information 500b (in a state with no user granted the temporary control right) before a "temporary" cell is added to the row (labeled "b") at the column of the control right 514.

If the original control right information 500b is updated to the control right information 500a with the "temporary" row (labeled "b" in FIG. 5A) added. After that, the "temporary" cell (labeled "b" in FIG. 5A) is then removed from the column of the control right 514, the original control right information 500b results.

The control right information 500a and the original control right information 500b are collectively referred to as control right information 500 except that the control right information 500a and the original control right information 500b are explicitly differentiated from each other.

Referring back to FIG. 2, the device management server 110, the device 120, and the mobile terminal 130 are continuously discussed.

The device status information transmitter 206 receives from the status determiner 204 the device ID 411, the status 462, and the recommended response operation 465 of the device 120 that is determined to be in the predetermined state that involves prompting the user to remote control the device 120 (hereinafter referred to as a "remote control target device 120"). The device status information transmitter 206 then references the device information 400 managed by the device information manager 203 and the control right information 500 managed by the control right manager 205 and generates the device status information of each mobile terminal 130 identified by the terminal ID 513 associated with the device ID 511 of the remote control target device 120. The device status information transmitter 206 transmits each piece of the device status information to each mobile terminal 130 identified by the terminal ID 513 associated with the device ID 511 of the remote control target device 120, namely, the mobile terminal 130 of each user granted the remote control right to the remote control target device 120.

The device status information transmitter 206 notifies each pieces of the generated device status information to the response detector 207.

FIG. 6 illustrates a data structure of device status information 600 as an example of the device status information generated by the device status information transmitter 206.

As illustrated in FIG. 6, the device status information 600 is data in a table format, and includes as records in a table format a device ID 611, status 612, installation location 613, recommended response operation 614, control right 615, notified user ID 616, and response status 617.

The device ID 611 is an identifier identifying the remote control target device 120 and is the device ID 411 received from the status determiner 204.

The status 612 indicates the state of the remote control target device 120 and is similar to the status 462 received from the status determiner 204.

The installation location 613 indicates a location where the remote control target device 120 is installed.

The recommended response operation 614 indicates a recommended response operation to the remote control target device 120 and is similar to the recommended response operation 465 received from the status determiner 204.

The control right 615 indicates the type of the control right granted to the user of the mobile terminal 130 as a transmission target.

The notified user ID 616 is an identifier that identifies each user granted the remote control right on the remote control target device 120, namely, each user holding the mobile terminal 130 as a transmission destination of the device status information generated by the device status information transmitter 206.

The response status 617 indicates the state of the response performed by the user on the remote control target device 120 in response to the transmission of the device status information 600 by the device status information transmitter 206. The response status 617 is "not yet" meaning that no response has not been performed, "completed" meaning that the response has been performed, and "aborted" meaning that the user has attempted to respond, but the execution of the response is aborted as a result of an unsuccessful communication.

The response status 617 indicates "not yet" at the generation of the device status information 600. If a change occurs in the state of the response of the user performed on the remote control target device 120 after the device status information transmitter 206 transmits the device status information 600, the device status information transmitter 206 updates the device status information 600 such that the change is reflected in the response status 617.

Referring back to FIG. 2, the discussion of the device management server 110, the device 120, and the mobile terminal 130 continues.

The response detector 207 detects the presence or absence of the response by the user on the device status information 600 received from the device status information transmitter 206.

Upon receiving the device status information 600 from the device status information transmitter 206, the response detector 207 saves the device ID 611, the status 612, the recommended response operation 614, and the notified user ID 616 therein, and then waits on standby for a response from the user. In other words, the response detector 207 starts waiting for the response information transmitted from the mobile terminal 130 of any user identified by the notified user ID 616.

FIG. 7 illustrates a data structure of response information 700 as the response information transmitted from the mobile terminal 130.

As illustrated in FIG. 7, the response information 700 is data in a table format, and includes records in an associated state a device ID 711, user ID 712, and requested operation 713.

The device ID 711 is an identifier identifying the device 120 having become a target of the remote control attempted by the user in response to the device status information 600 from the device status information transmitter 206. The device ID 711 is similar to the device ID 611 included in the device status information 600 transmitted from the device status information transmitter 206.

The user ID 712 is an identifier identifying the user who has attempted to remote control the device 120 identified by the device ID 711 in response to the transmission of the device status information 600 from the device status information transmitter 206.

The requested operation 713 indicates the remote control operation the user has attempted in response to the device status information 600 from the device status information transmitter 206.

In the above discussion, the response information 700 is transmitted from the mobile terminal 130, and the response detector 207 waits on standby for the response information transmitted from the mobile terminal 130.

The operation attempted to the corresponding device 120 subsequent to the transmission of the device status information 600 from the device status information transmitter 206 is not necessarily limited to an attempt to remote control the device 120.

For example, a person close to the target device 120 may directly operate the device 120. Such a person may be a user holding the mobile terminal 130 as a transmission destination of the device status information 600 from the device status information transmitter 206, or may be a person not related to the transmission of the device status information 600 from the device status information transmitter 206. Such a person may directly operate the device 120. For example, a family member who happens to find that the device 120 has been running in a room with nobody therewithin for a long period of time may directly operate the remote controller of the air-conditioner after the transmission of the device status information 600 and may power off the air-conditioner.

In this way, a person who uses the mobile terminal 130 may directly operate the target device 120 without remote controlling. In such a case, the directly operated device 120 generates the response information 700 and then transmits the response information 700 to the device management server 110.

In such a case, however, there are cases that the person who has directly operated may not necessarily be identified.

The target device 120 may then generate the response information 700 with the user ID 712 being as an identifier indicating a "home user".

Referring back to FIG. 2, the discussion of the device management server 110, the device 120, and the mobile terminal 130 continues.

The response detector 207 starts waiting for the response information, and continues to wait until a predetermined period of time T1 (5 minutes, for example) has elapsed.

The time elapse is measured by a timer in the response detector 207.

Upon receiving the response information 700 during the predetermined period of time T1 subsequent to the start of waiting for the response information, the response detector 207 notifies the device operation request transmitter 208 of the requested operation 713 included in the response information 700, and ends the waiting for the reception of the response information. The response detector 207 then starts waiting to receive a successful operation result notification indicating a success of the requested operation or an aborted operation result notification indicating that the requested operation is aborted, transmitted from the device operation result receiver 209.

Upon receiving the successful operation result notification after the start of waiting to receive the notification, the response detector 207 generates response completion information, and ends the waiting by notifying the generated response completion information to the response completion information transmitter 210. Upon receiving the aborted operation result notification, the response detector 207 requests the device status information transmitter 206 to re-transmit the device status information.

FIG. 8 illustrates a data structure of response completion information 800 as an example of the response completion information generated by the response detector 207.

As illustrated in FIG. 8, the response completion information 800 is data in a table format and includes as records in an associated format a device ID 811, status 812, response user ID 813, and response operation 814.

The device ID 811 is an identifier identifying the device 120 that the user has attempted to remote control in response to the transmission of the device status information 600 from the device status information transmitter 206. The device ID 811 is similar to the device ID 711 included in the response information 700.

The status 812 indicates a state immediately prior to the execution of the remote control on the device 120 identified by the device ID 811.

The response user ID 813 is an identifier identifying the user who has attempted to remote control the device 120 identified by the device ID 711 in response to the transmission of the device status information 600 from the device status information transmitter 206. The response user ID 813 is similar to the user ID 712 included in the corresponding response information 700.

The response operation 814 indicates information related to a remote control operation executed when the user has attempted to remote control the device 120 in response to the transmission of the device status information 600 from the device status information transmitter 206.

In the above discussion, the operation performed on the corresponding device 120 after the device status information transmitter 206 transmits the device status information 600 is the remote control operation.

However, as described above, the operation performed on the corresponding device 120 after the device status information transmitter 206 transmits the device status information 600 may not necessarily be limited to a remote control operation.

For example, it is contemplated that a person close to the target device 120 directly operates the device 120.

In such a case, the status 812 indicates a state immediately prior to the execution of the direction operation on the device 120 identified by the device ID 811. The response user ID 813 is an identifier identifying the home user, and the response operation 814 indicates the direct operation performed on the device 120.

Referring back to FIG. 2, the discussion of the device management server 110, the device 120, and the mobile terminal 130 continues.

The response detector 207 may not receive the response information even after the time elapse of the predetermined period of time T1 from the start of waiting to receive the response information. In such a case, the response detector 207 transfers, to the control right updater 211, a no-response notification indicating that the user has not responded, and then ends the waiting to receive the response information.

Upon receiving the requested operation 713 notified by the response detector 207, the device operation request transmitter 208 transmits to the corresponding device 120 a device operation request corresponding to the received requested operation 713.

The device operation result receiver 209 receives the operation results transmitted from the device 120. If the received operation results indicate that a requested operation responsive to a device operation request transmitted in advance of the reception of the operation results has been performed, or indicate that the home user has directly operated the device 120, the device operation result receiver 209 transfers to the response detector 207 a successful operation result reception notification indicating that the requested operation has been successfully performed. If the received operation results indicate that the requested operation responsive to the device operation request transmitted in advance of the reception of the operation results has not been performed, or indicate that the operation results has not been received for a predetermined period of time subsequent to the transmission of the device operation request, the device operation result receiver 209 transfers to the response detector 207 the aborted operation result reception notification indicating that the requested operation has been aborted.

Upon receiving the response completion information from the response detector 207, the response completion information transmitter 210 references the control right information 500 managed by the control right manager 205, and transmits the response completion information 800 to the mobile terminal 130 of the user granted the control right to the target device 120. The response completion information transmitter 210 transmits to the control right updater 211 a deletion request to delete the row including the cell showing "temporary" control right from the control right information 500.

When the control right updater 211 receives the no-response notification from the response detector 207. The control right information 500 managed by the control right manager 205 may not include the "temporary" cell at the column of the control right 514 with respect to the device 120. In such a case, the control right updater 211 identifies the user ID identifying a user who is temporarily granted the control right to remote control the device 120, in accordance with a predetermined algorithm. The control right updater 211 updates the control right information 500 by adding a row including a "temporary" cell at the column of the control right 514.

The predetermined algorithm identifies the user who is temporarily granted the remote control right to the device 120 using the family user information stored on the family user memory 212.

The algorithm is described below.

The family user memory 212 saves the family user information.

FIG. 9 illustrates a data structure of family user information 900 as an example of the family user information stored on the family user memory 212.

As illustrated in FIG. 9, the family user information 900 is data in a table format, and includes as records in an associated state a family user ID 911 and a corresponding terminal ID 912.

Each family user ID 911 is an identifier identifying a user registered as a member of the family.

The terminal ID 912 is an identifier identifying the mobile terminal 130 used by the user identified by the corresponding family user ID 911.

The algorithm is further discussed with reference to FIG. 2.

The control right updater 211 receives the no-response notification from the response detector 207. If the "temporary" cell is not present at the column of the control right 514 with respect to the device 120 in the control right information 500 managed by the control right manager 205, the control right updater 211 references the family user information 900 stored on the family user memory 212, and identifies the user ID of a user other than the user granted the "standard" control right from the family user ID 911 associated with the user ID of the user granted the "standard" control right to the device 120. The control right updater 211 thus identifies the identifier temporarily granted the control right of the remote control operation to the device 120.

The family user ID 911 associated in the family user information 900 may not necessarily be a member of the family living at the same home. For example, identifiers identifying grandparents living at a different house may be included in the associated family user IDs 911.

In the above discussion, the family user information 900 includes one set of the associated family user ID 911. The family user ID 911 may not necessarily be one family. The number of families may be 100 families, for example.

The algorithm has been discussed. Referring back to FIG. 2, the discussion of the device management server 110, the device 120, and the mobile terminal 130 continues.

Upon receiving a delete request notified from the response completion information transmitter 210, the control right updater 211 deletes a row including the cell showing "temporary" control right from the control right information 500 managed by the control right manager 205. The response completion information transmitter 210 thus updates the control right information 500.

The "temporary" grant of the control right to remote control the device 120 is suspended. The user who is granted the control right to remote control the device 120 is limited to the user granted the "standard" control right.

The mobile terminal 130 includes a network transceiver 231, a device status information receiver 232, a response completion information receiver 233, a display user interface (UI) generator 234, a response information transmitter 235, and a UI module 240. The mobile terminal 130 has a function of displaying information notified by the device management server 110 and a function of operating the device 120 via the device management server 110.

The mobile terminal 130 includes, as hardware, a processor, a memory, and the like (these elements are illustrated), and implements the elements when the processor executes the program stored on the memory.

The UI module 240 is a graphic interface, and displays an image and receives an input operation from the user. The graphical interface includes a display 241 including a device, such as an electroluminescence (EL) display, having a function of displaying an image, and a user input unit 242 including a device, such as a hardkey or a touchpad, having a function of receiving an input operation from the user.

The user input unit 242 is not limited in function to receiving a touch input operation from the user, and may further include receiving an audio input via a microphone, or a gesture input via an acceleration sensor.

The network transceiver 231 includes a communication unit that performs the communication via a wireless LAN, Bluetooth (registered trademark), or a cellular phone network, and exchanges data with an external device (such as the device management server 110 or the device 120) via the network 140.

The device status information receiver 232 receives the device status information transmitted from the device management server 110, and transfers the received device status information to the display UI generator 234.

The response completion information receiver 233 receives the response completion information transmitted from the device management server 110, and notifies the received response completion information to the display UI generator 234.

The display UI generator 234 generates an image to be displayed to the user, in accordance with the device status information notified by the device status information receiver 232 or the response completion information notified by the response completion information receiver 233, and causes the display 241 to display the generated image.

FIG. 10A through FIG. 10D illustrate examples of images generated in accordance with the device status information and displayed on the display 241. FIG. 11A and FIG. 11B illustrate examples of images generated in accordance with the response completion information and displayed on the display 241.

The images displayed on the display 241 are described with reference to these image examples.

Figure 10A:
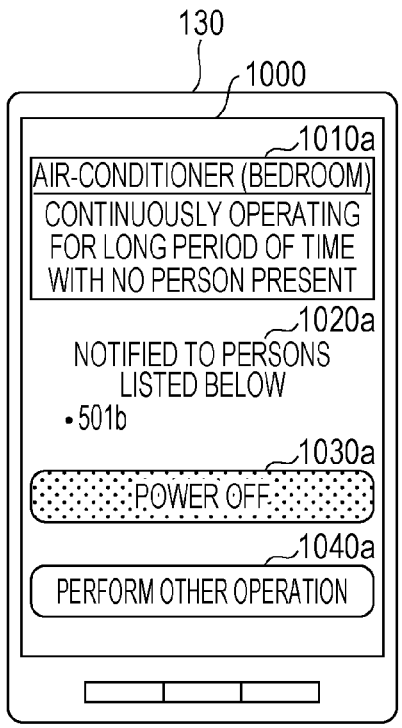
FIG. 10A illustrates a first example of an image displayed on a display unit.
Figure 11A:
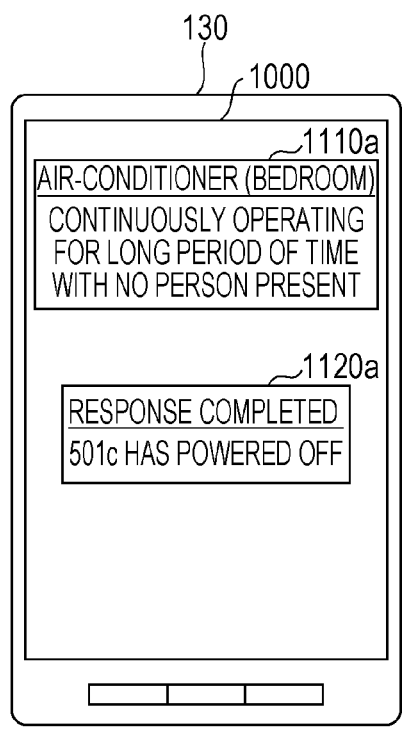
FIG. 11A illustrates a fifth example of the image displayed on the display unit.
Figure 11B:
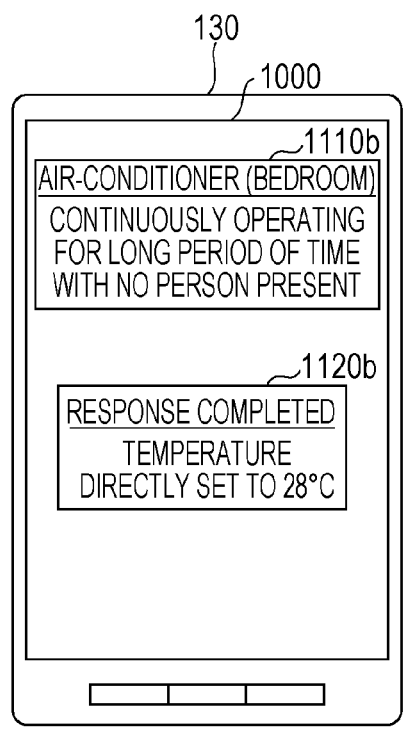
FIG. 11B illustrates a sixth example of the image displayed on the display unit.

FIG. 10A illustrates an example of an image displayed on the mobile terminal 130 of a user 501*a* granted the "standard" control right to remote control the device 120 (air-conditioner installed in the bedroom) when the device status information 600 including the status 612 "with no person continuously present for long period of time with power on" is notified to the mobile terminal 130.

Note that the users granted the "standard" right control to remote operate are user 501*a* and user 501*b*.

A touchpanel 1000 includes a liquid-crystal display forming the display 241 and a transparent touchpad forming the user input unit 242 overlaid on the display 241.

A text 1010*a* is a character string that is generated in accordance with the device ID 611, the status 612, and the installation location 613 included in the device status information 600. The text 1010*a* indicates information related to the device 120 as an air-conditioner installed in the bedroom, the installation location of the device 120, and the state of the device 120.

A text 1020*a* is character strings generated in accordance with the notified user ID 616 included in the device status information 600. The text 1020*a* includes the character string reading "notified to persons listed below" and the character string indicating a user identified by an identifier excluding the identifier of the user 501*a* of the mobile terminal 130, from among the identifiers included in the notified user ID 616.

The user 501*a* recognizes the presence of a user who is similarly notified with the text 1020*a* displayed. Since an indication indicating the response completion (such as a text 1120*a* of FIG. 11A or a text 1120*b* of FIG. 11B) does not appear on a display screen, the user recognizes that the other user having received the same notification does not take any operation responsive to the notification. This arrangement benefits from reducing the frequency of occurrence that the users may leave the responsibility to each other in the response to the notification, and fail to take any kind of action as a result.

An icon 1030*a* is shaped like a button generated in accordance with the recommended response operation 614 included in the device status information 600, and includes a character string indicating a recommended operation indicated by the recommended response operation 614.

The user input unit 242 receives the recommended operation indicated by the recommended response operation 614 when the icon 1030*a* is touched.

With the icon 1030*a* displayed, the user of the mobile terminal 130 is able to respond to the notification without shifting to another device operation action menu screen. This arrangement benefits from reducing the frequency of occurrence that the user having verified the notification puts responding to the notification off and forgets to respond after all.

An icon 1040*a* is shaped like a button that is generated when the "standard" control right is included in the control right 615 in the device status information 600. The icon 1040*a* includes a character string reading "perform other operation".

The icon 1040*a* shifts the screen to a device operation menu screen (not illustrated) when a touch operation is performed.

The user input unit 242 receives all remote control inputs enabled on the target device 120 in response to the operation of the user on the device operation menu screen (not illustrated).

Figure 10B:
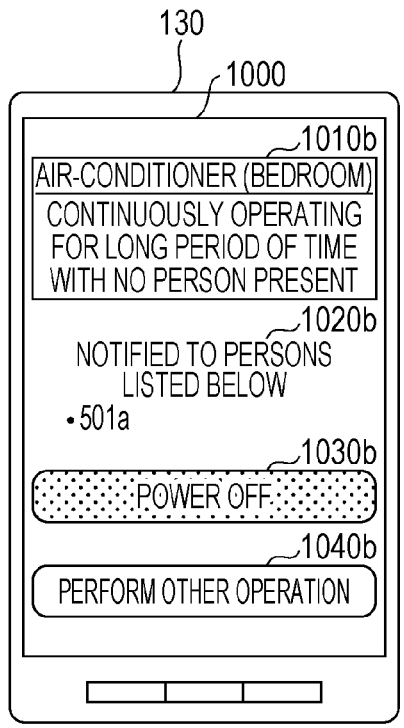
FIG. 10B illustrates a second example of the image displayed on the display unit.

FIG. 10B illustrates an example of an image that is displayed on the mobile terminal 130 of the user 501*b* granted the "standard" remote control right to the device 120 (air-conditioner installed in the bedroom) when the device status information 600 including the status 612 "continuously operating for long period of time with no person present" is notified to the mobile terminal 130.

The users granted the "standard" remote control right are user 501*a* and user 501*b*.

The image of FIG. 10A is similar to the image of FIG. 10B. The text 1020*a* of FIG. 10A includes the character string indicating user 501*b* while the text 1020*b* of FIG. 10B includes the character string indicating user 501*a*.

Figure 10C:
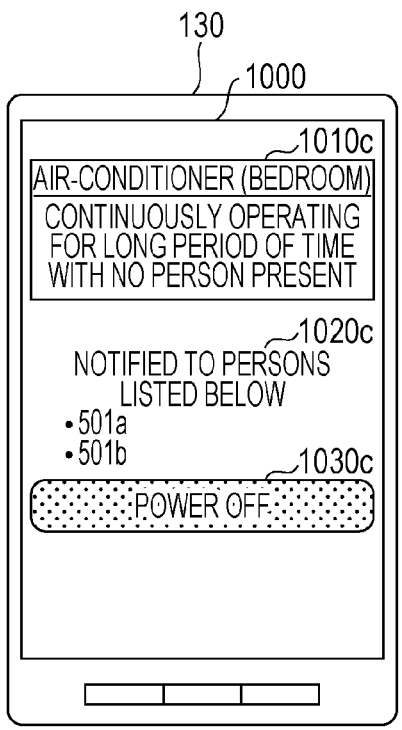
FIG. 10C illustrates a third example of the image displayed on the display unit.

FIG. 10C illustrates an example of an image that is displayed on the mobile terminal 130 of the user 501*c* granted the "temporary" remote control right on the device 120 (the device 120 is an air-conditioner in the bedroom) when the device status information 600 including the status 612 "continuously operating for long period of time with no person present" is notified to the mobile terminal 130.

The users granted the "standard" remote control right are user 501*a* and user 501*b*, and the user granted the "temporary" remote control right is user 501*c*.

The image of FIG. 10A is different from the image of FIG. 10C in two points as below.

A first difference is that the text 1020*a* of FIG. 10A includes the character string indicating user 501*b* while the text 1020*c* of FIG. 10C includes the character strings indicating user 501*a* and user 501*b*.

Since the text 1020*c* displays user 501*a* and user 501*b*, granted the "standard" remote control right, user 501*c* recognizes that the device status information has been notified to the mobile terminal 130 of user 501*c* because any response is taken by neither user 501*a* nor user 501*b*.

A second difference is that the icon corresponding to the icon 1040*a* illustrated on FIG. 10A is not displayed as illustrated in FIG. 10C.

This difference depends on whether the "standard" control right in the control right 615 is included in the device status information 600 received by the mobile terminal 130 (corresponding to the case of FIG. 10A), or not included (corresponding to the case of FIG. 10C).

The icon corresponding to the icon 1040a is not displayed on the mobile terminal 130 of user 501c granted the "temporary" remote control right, namely, on the mobile terminal 130 that displays the image of FIG. 10C.

User 501c granted the "temporary" remote control right is unable to shift the screen to the device operation menu screen, and the remote control allowed to the target device is limited to the recommended operation indicated at the recommended response operation 614.

This arrangement reduces the possibility that a remote control operation error or an unscrupulous remote control operation is performed by a user granted the "temporary" remote control right, namely, a user who is not granted the remote control right to the target device 120, but is temporarily granted the remote control right.

Figure 10D:
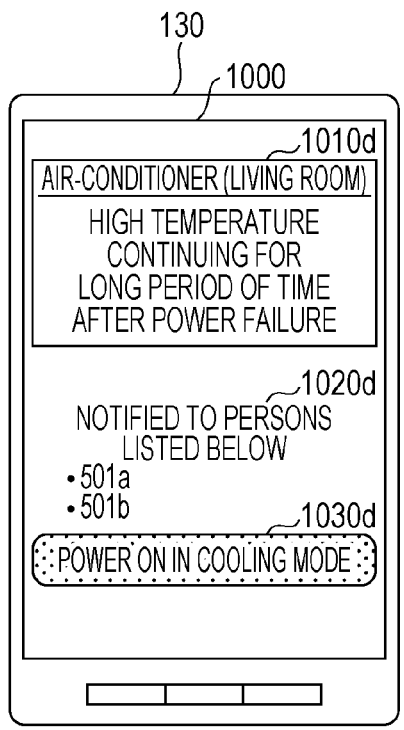
FIG. 10D illustrates a fourth example of the image displayed on the display unit.

FIG. 10D illustrates an example of an image that is displayed on the mobile terminal 130 of a user 501d granted the "temporary" remote control right on the target device 120 (the device 120 is an air-conditioner in the living room) when the device status information 600 including the status 612 "high temperature continuing for long period of time after power failure" is notified the mobile terminal 130.

The users granted the "standard" remote control right are user 501a and user 501b, and the user granted the "temporary" remote control right is user 501d.

The image of FIG. 10C is different from the image of FIG. 10D in the following two points.

A first difference is that the text 1010c of FIG. 10C includes the character reading "air-conditioner (bedroom)" and the character string reading "continuously operating for long period of time with no person present" while the text 1010d of FIG. 10D includes the character string reading "air-conditioner (living room)" and the character string reading "high temperature continuing for long period of time after power failure".

A second difference is that the icon 1030c of FIG. 10C includes the character string reading "power off" as a recommended operation, in other words, is an icon receiving the recommended operation as power off while the icon 1030d of FIG. 10D is for receiving, as the recommended operation, power on in cooling mode. More specifically, the difference is that the icon 1030d of FIG. 10D is enabled to receive the recommended operation input to power on in the cooling mode.

As in FIG. 10C, an icon corresponding to the icon 1040a illustrated in FIG. 10A is not illustrated in FIG. 10D.

Position information of the device 120 may be displayed in an illustration on a map in addition to the character strings of the texts 1010a through 1010d in FIG. 10A through FIG. 10D. In such a case, the mobile terminal 130 may store a layout of the home of the user of the mobile terminal 130, and generates an illustration to be displayed, in accordance with the stored layout and the installation location 613 included in the device status information 600.

FIG. 11A illustrates an example of an image that is displayed on the mobile terminal 130 of the user granted the "standard" remote control right and the mobile terminal 130 of the user granted the "temporary" remote control right to the target device 120 (the device 120 is herein an air-conditioner installed in the bedroom) when the response completion information 800 including the status 812 of "continuously operating for long period of time with no person present", the response user ID 813 of "501a", and the response operation 814 of "power off" is notified.

A text 1110a is a character string that is generated based on the device ID 811 and the status 812 included in the response completion information 800, and the installation location 613 included in the device status information 600 received in advance of receiving the response completion information 800. The character string herein indicates the device 120 installed as an air-conditioner in the bedroom, the installation location and the status thereof.

The text 1110a is similar to the text 1010a of FIG. 10A.

A text 1120a is a character string that is generated based on the response user ID 813 and the response operation 814 included in the response completion information 800. More specifically, the text 1120a includes the character string "response completed", the character string meaning that the user identified by the response user ID 813 has performed the operation indicated by the response operation 814, more specifically, meaning that 501c has powered off".

FIG. 11B illustrates an example of an image that is displayed on the mobile terminal 130 of the user granted the "standard" remote control right and the mobile terminal 130 of the user granted the "temporary" remote control right to the target device 120 (the device 120 is herein an air-conditioner installed in the bedroom) when the response completion information 800 including the status 812 of "continuously operating for long period of time with no person present", the response user ID 813 of "home user", and the response operation 814 of "set temperature to 28° C." is notified.

The device management server 110 transmits to the mobile terminal 130 the device status information 600 including the recommended response operation 614 indicating "power off". The image illustrated herein is displayed when the mobile terminal 130 is not remote controlled, but a person close to the target device 120 directly operates the target device 120 to "set the device 120 to a temperature of 28° C.", namely, performs an operation other than the operation indicated at the recommended response operation 614.

The image of FIG. 11A is similar to the image of FIG. 11B, but there is a difference that the text 1120a of FIG. 11A includes the character string reading "501 a has powered off" while the text 1120b includes the character string reading "temperature directly set to 28° C.".

With the text 1120a displayed as illustrated in FIG. 11A and the text 1120b displayed as illustrated in FIG. 11b, the user recognizes that an operation has been performed to the device 120 and who has performed that operation.

Referring back to FIG. 2, the discussion of the device management server 110, the device 120, and the mobile terminal 130 continues.

The response information transmitter 235 generates the response information in response to the operation performed by the user and then received by the user input unit 242. The response information transmitter 235 then transmits the generated response information to the device management server 110.

The operation of the remote control system 100 is described with reference to the drawings.

Operation

The remote control system 100 performs a notification process characteristic thereof.

The notification process is described below.

Figure 12:
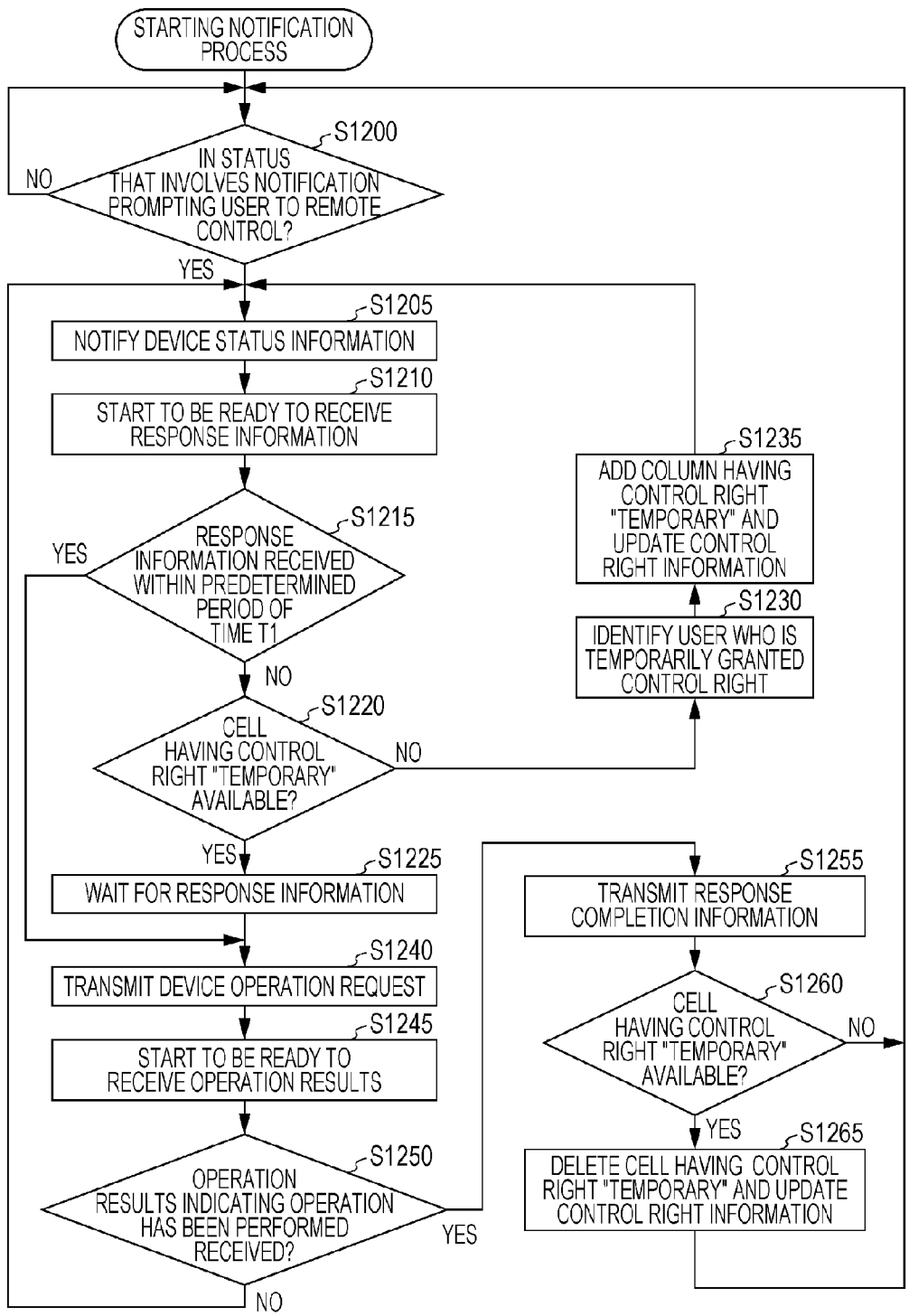
FIG. 12 is a flowchart illustrating a notification process.

FIG. 12 is a flowchart illustrating the notification process.

The notification process is triggered when the device management server 110 starts operating.

In response to the start of the notification process, the device management server 110 waits on standby until the status determiner 204 determines that the device 120 is in a predetermined state that involves prompting the user to remote control the device 120 (no branch is repeated in step S1200).

The status determiner 204 may determine that the device 120 is in the predetermined state that involves prompting the user to remote control the device 120 (yes branch from step S1200). The device status information transmitter 206 then generates the device status information 600 on each mobile terminal 130 identified by the terminal ID 513 associated with the device ID 511 of the remote control target device 120 by referencing the device information 400 managed by the device information manager 203, and the control right information 500 managed by the control right manager 205. The device status information transmitter 206 transmits each piece of the generated device status information 600 to each mobile terminal 130 identified by the terminal ID 513 associated with the device ID 511 of the remote control target device 120 (step S1205).

If the operation in step S1205 is preformed for the first time subsequent to the start of the notification process, the control right information 500 managed by the control right manager 205 is the original control right information 500 (such as the control right information 500b of FIG. 5B) before a "temporary" cell is added at the column of the control right 514. For this reason, the mobile terminal 130 serving as the transmission destination of the device status information 600 is limited to the mobile terminal of the user who is granted the "standard" control right. Displayed then on the mobile terminal 130 having received the device status information 600 is the image of FIG. 10A (on the mobile terminal 130 of user 501a) or the image of FIG. 10B (on the mobile terminal 130 of user 501b).

When the device status information 600 is transmitted to each of the mobile terminals 130, the response detector 207 starts waiting to receive the response information 700 returned from any mobile terminal 130 or the target device 120 (step S1210).

If the response detector 207 has not received the response information 700 for the predetermined period of time T1 from waiting start (no branch from step S1215), the control right updater 211 determines whether a "temporary" cell is present at the column of the control right 514 in the control right information 500 managed by the control right manager 205 with respect to the device 120 (step S1220).

If the control right updater 211 in the operation of step S1220 determines that a "temporary" cell is present at the column of the control right 514 with respect to the device 120 (yes branch from S1220), the response detector 207 continues to wait until the response information 700 has been received (step S1225).

If the control right updater 211 in the operation of step S1220 determines that no "temporary" cell is present at the column of the control right 514 with respect to the device 120 (no branch from S1220), the control right updater 211 references the family user information 900 stored on the family user memory 212 and identifies as an identifier the user ID of a user other than the user granted the "standard" remote control right from the family user ID 911 associated with the user ID of the user granted the "standard" remote control right (step S1230). The identifier herein identifies the user temporarily granted the remote control right on the device 120.

The control right updater 211 updates the control right information 500 managed by the control right manager 205 by adding a row including a "temporary" cell associated with the control right 514 for the identified user ID (step S1235). The updated control right information 500 may correspond to the control right information 500a of FIG. 5A (the added cell corresponds to the row labeled "b" in the control right information 500a).

Processing returns to step S1205 subsequent to step S1235, and the operations in step S1205 and subsequent steps are repeated.

If the operation in step S1205 is performed again with the control right 514 including "temporary" in the control right information 500, the mobile terminal 130 serving as the transmission destination of the device status information 600 is not limited to the mobile terminal of the user granted the "standard" remote control right unlike when the operation in step S1205 is performed for the first time subsequent to the start of the notification process. The transmission destination of the device status information 600 may be the mobile terminal of the user granted the "temporary" remote control right. The image of FIG. 10C (if user 501c is a holder of the mobile terminal 130) is displayed on the mobile terminal 130 of the user granted the "temporary" remote control right having received the device status information 600.

If the response detector 207 has received the response information 700 within the predetermined period of time T1 from the wait start in the operation of step S1215 (yes branch from step S1215) or subsequent to the operation in step S1225, the device operation request transmitter 208 transmits to the device 120 a device operation request corresponding to the requested operation 713 included in the response information 700 (step S1240), and waits to receive operation results from the device 120 to which the device operation request has been transmitted (step S1245).

If the operation results that the operation of the device operation request has been performed or that the home user has directly operated the device 120 are received (yes branch from step S1250), the response detector 207 generates the response completion information. The response completion information transmitter 210 references the control right information 500 managed by the control right manager 205, and transmits the generated response completion information to the mobile terminal 130 of the user granted the control right to the target device 120 (step S1255).

If the operation results that the operation of the device operation request has been performed or that the home user has directly operated the device 120 are not received (no branch from step S1250), the response detector 207 requests the device status information transmitter 206 to re-transmit the device status information. The device status information transmitter 206 updates the device status information 600 to set the response status 617 to be "aborted". Processing returns to step S1205 to repeat step S1205 and subsequent steps.

In succession to step S1255, the control right updater 211 determines whether a "temporary" cell is present at the column of the control right 514 in the control right information 500 managed by the control right manager 205 with respect to the device 120 (step S1260).

If a "temporary" cell is present at the column of the control right 514 with respect to the device 120 (yes branch from step S1260), the control right updater 211 deletes the row having the cell showing "temporary" control right from the control right information 500, and thus updates the control right information 500 managed by the control right manager 205 (step S1265).

If no "temporary" cell is present at the column of the control right 514 with respect to the device 120 (no branch from step S1260), or subsequent to the operation in step S1265, processing returns to step S1200 to repeat step S1200 and subsequent steps.

The notification process has been described with reference to the flowchart of FIG. 12.

The specific operations of the device management server 110, the device 120, and the mobile terminal 130 in the remote control system 100 in the notification process are described below.

The specific operations in the notification process described below are based on the following course of action. A mobile terminal 130a is used by a first user granted the remote control right to the device 120. The user ID of a second user as a family member of the first user is associated with the user ID of the first user in the family user information 900. A mobile terminal 130b is used by the second user. The device management server 110 determines that the device 120 is in a predetermined state that involves prompting the user to remote control the device 120, based on the status log 300 transmitted from the device 120, and the information stored on the device management server 110. Although the device management server 110 transmits the device status information 600 to the mobile terminal 130a, the mobile terminal 130a and the device 120 do not transmit the response information within the predetermined period of time T1.

Figure 13:
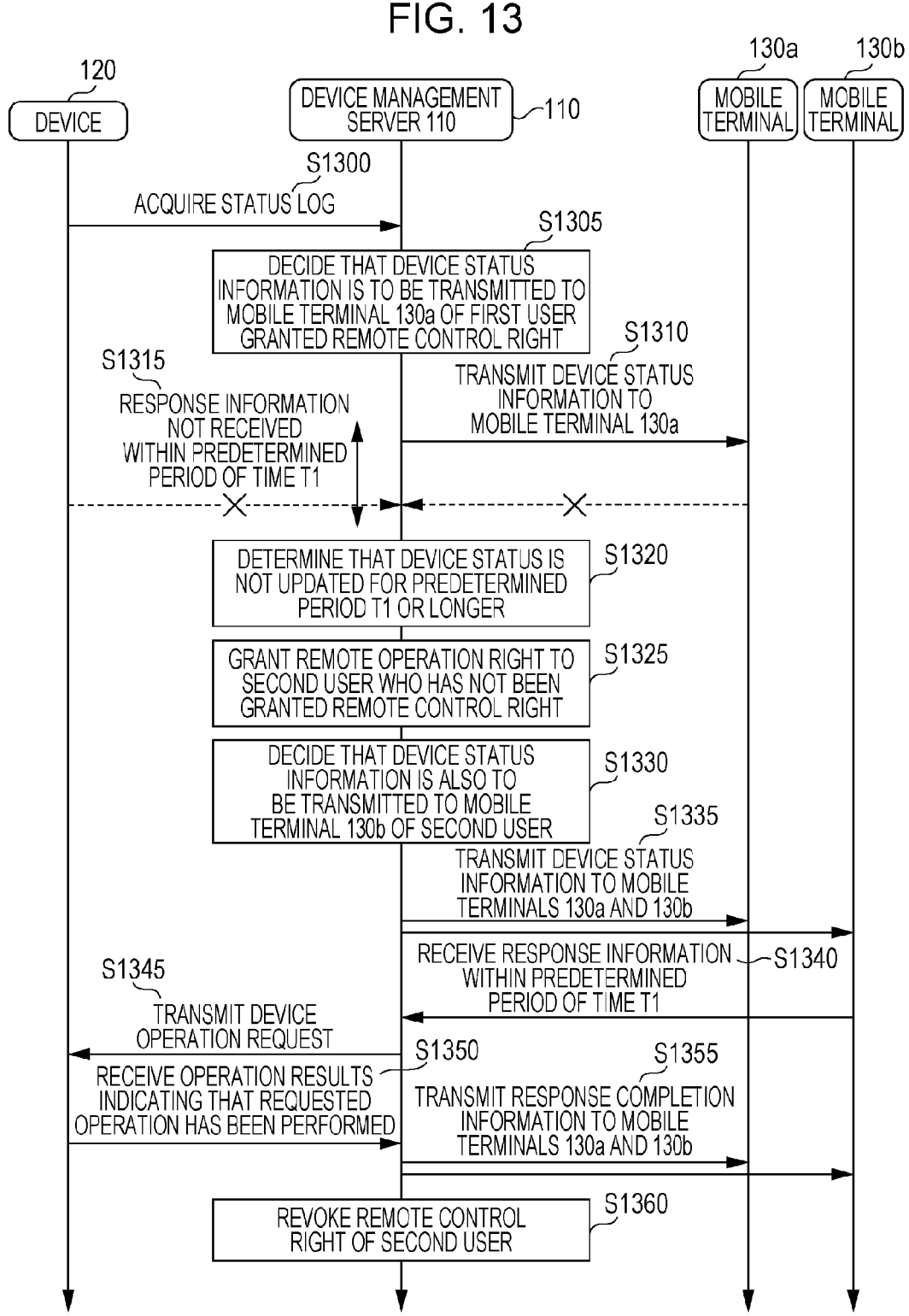
FIG. 13 is a sequence chart of the remote control system.

FIG. 13 is a sequence chart illustrating the operations of the device management server 110, the device 120, the mobile terminal 130a, and the mobile terminal 130b in the remote control system 100.

The device management server 110 acquires the status log from the device 120 (step S1300), and updates the status log table 350 stored on the device management server 110. The device management server 110 references the device information 400, the device status determination information 450, and the control right information 500 stored thereon, and decides to transmit the device status information to the mobile terminal 130a of the first user granted the remote control right (step S1305 (corresponding to the yes branch from step S1200 of FIG. 12)).

The device management server 110 generates the device status information 600 and transmits the generated device status information 600 to the mobile terminal 130a (step S1310 (corresponding to step S1205 of FIG. 12)).

The mobile terminal 130a and the device 120 do not transmit the response information 700, and the device management server 110 does not receive the response information 700 within the predetermined period of time T1 subsequent to the transmission of the device status information 600 (step S1315 (corresponding to steps S1210 and the no branch from step S1215 of FIG. 12)).

The device management server 110 determines that the device 120 remains unchanged in state for the period of time T1 or longer (step S1320), and references the family user information 900 stored on the device management server 110. The device management server 110 grants the second user not having granted the remote control right the remote control right (step S1325) and decides to transmit the device status information to the mobile terminal 130b of the second user (step S1330 (the series of steps S1320, S1325, and S1330 corresponds to the series of steps S1220, the no branch from step S1230, and step S1255 of FIG. 12)).

The device management server 110 transmits the device status information 600 to the mobile terminal 130a and the mobile terminal 130b (step S1355 (corresponding to step S1205 of FIG. 12)).

If the response information 700 is transmitted from the mobile terminal 130b within the predetermined period of time T1 from the transmission of the device status information 600, the device management server 110 receives the response information 700 (step S1340 (corresponding to step S1210 and the yes branch from step S1215 of FIG. 12)).

Upon receiving the response information 700, the device management server 110 generates and transmits the device operation request to the device 120 (step S1345 (corresponding to step S1240 of FIG. 12)).

When the device 120 transmits the operation results indicating that the requested operation of the device operation request has been performed, the device management server 110 receives the operation results (step S1350 (corresponding to step S1245 and the yes branch from step S1250 of FIG. 12)). The device management server 110 generates the response completion information 800, and then transmits the response completion information 800 to the mobile terminal 130a and the mobile terminal 130b (step S1355 (corresponding to step S1255 of FIG. 12)).

The device management server 110 revoke the remote control right granted to the second user (step S1360 (corresponding to the yes branch from step S1260 and step S1265 of FIG. 12)).

The operations of the device management server 110, the device 120, and the mobile terminal 130 in the remote control system 100 in accordance with the sequence chart of FIG. 13 have been discussed.

Even if the device 120 is determined to be in the predetermined state involving prompting the user to remote control the device 120 in the remote control system 100, the user granted the "standard" remote control right on the device 120 may be unable to respond to the state of the device 120. The remote control system 100 then temporarily grants all the members of the family of the user the remote control right to the device 120, and the device 120 notifies each user that the device 120 is in the predetermined state involving prompting the user to remote control the device 120.

This arrangement reduces the possibility that the response to the device 120 determined to be in the predetermined state involving prompting the user to remote control the device 120 is delayed.

The temporarily granted remote control right is limited to the recommended response operation that is remote controllable. The temporarily granted remote control right is revoked when the response operation is performed on the device 120. An unscrupulous device operation by a user not granted the "standard" remote control right is thus controlled.

Second Embodiment

Summary

A remote control system as a modification of the remote control system 100 of the first embodiment that implements a remote control method of the disclosure is described below.

The remote control system 100 of the first embodiment identifies the user ID of the user temporarily granted the remote control right. In this method, the remote control system 100 identifies as the user ID of the user temporarily granted the remote control right the family user ID 911 of the user other than the user granted the "standard" remote control right from among the family user IDs 911 associated with the user ID of the user granted the "standard" remote control right in the family user information 900 stored on the family user memory 212.

The modified remote control system of a second embodiment also identifies the user ID of the user temporarily granted the remote control right. In this method, the modified remote control system identifies as the user ID of the user temporarily granted the remote control right the user ID other than the user granted the "standard" remote control right from among the user IDs of all users who have remote controlled the device which the user granted the "standard" remote control right has remote controlled.

The modified remote control system is described with reference to the drawings focusing a difference from the remote control system 100 of the first embodiment.

Configuration

The modified remote control system includes a device management server 1410 instead of the device management server 110 in the remote control system 100 of the first embodiment.

The device management server 1410 is similar in hardware to the device management server 110 but different in software from the device management server 110 in part of the software stored as an execution target. As a result, the device management server 1410 is different in function from the device management server 110.

The device management server 1410 is described with reference to the drawings.

Figure 14:
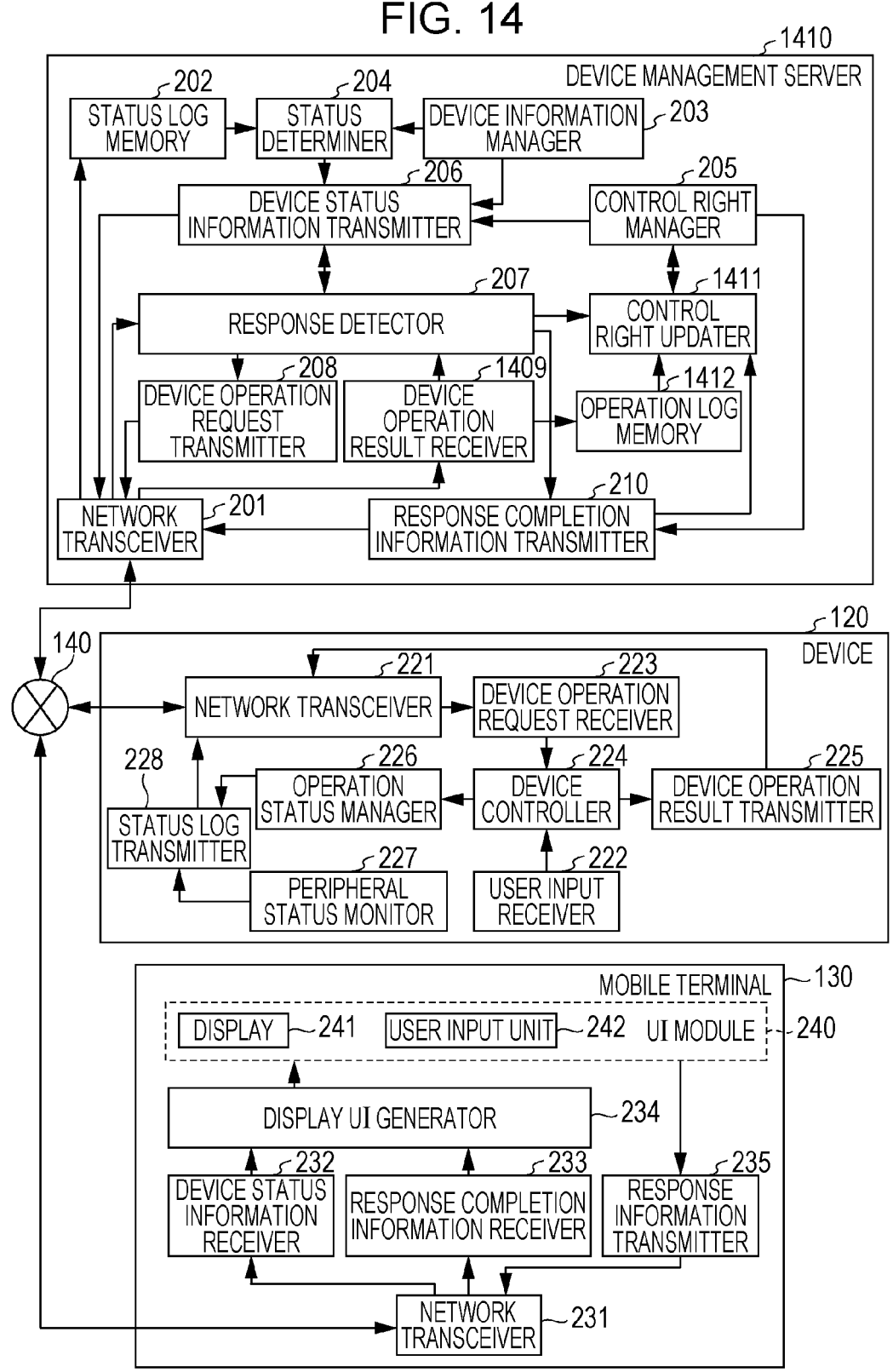
FIG. 14 is a functional block diagram illustrating a device management server, a device, and a mobile terminal.

FIG. 14 is a functional block diagram illustrating the device management server 1410, the device 120, and the mobile terminal 130.

As illustrated in FIG. 14, the device management server 1410 is different from the device management server 110 in that the device operation result receiver 209 is replaced with a device operation result receiver 1409, the control right updater 211 is replaced with a control right updater 1411, the family user memory 212 is removed, and an operation log memory 1412 is added.

The device operation result receiver 1409 performs the following operations in addition to the operations of the device operation result receiver 209 of the first embodiment.

Upon receiving the operation results transmitted from the device 120, the device operation result receiver 1409 generates an operation log based on the received operation results. The generated operation log is transferred to the operation log memory 1412.

FIG. 15A illustrates a data structure of an operation log 1500 as an example of the operation log generated by the device operation result receiver 1409.

Referring to FIG. 15A, the operation log 1500 is data in a table format, and includes records in an associated state a time stamp 1511, device ID 1512, user ID 1513, and operation 1514.

The time stamp 1511 indicate the time the status log 300 is generated.

The device ID 1512 is an identifier identifying the operated device 120.

The user ID 1513 is an identifier identifying a user who operates the device 120 identified by the device ID 1512 at the time indicated by the time stamp 1511. If the device 120 is directly operated, it is difficult to identify the person who had directly operated the device 120. An identifier indicating a "home user" (such as "501*z*") is allocated to the user ID 1513.

The operation 1514 indicates contents of the operation performed on the device 120 identified by the device ID 1512 at the time indicated by the time stamp 1511.

Referring back to FIG. 14, the device management server 1410 is described further.

The operation log memory 1412 receives the operation log from the device operation result receiver 1409 and stores the operation log. Each time the operation log memory 1412 receives the operation log, the operation log memory 1412 updates the operation log table and stores the updated operation log table.

FIG. 15B illustrates a data structure of an operation log table 1550 as an example of the operation log stored on the operation log memory 1412.

Referring to FIG. 15B, the operation log 1550 is data of storage of the past operation log 1500, and includes records in an associated state a time stamp 1561, device ID 1562, user ID 1563, and operation 1564.

The time stamp 1561, the device ID 1562, the user ID 1563, and the operation 1564 are respectively similar to the time stamp 1511, the device ID 1512, the user ID 1513, and the operation 1514 in the operation log 1500 (see FIG. 15A). These pieces of data have been described.

According to the operation log table 1550, the users operating the device 120 with the device ID 1562 being 120*a* (such as an air-conditioner in the bedroom) include users having 501*a* and 501*b* as the user ID 1563. The user operating the device 120 with the device ID 1562 being 120*b* (such as a lighting device in the bedroom) is the user having 501*z* (corresponding to a "home user") as the user ID 1563. The users operating the device 120 with the device ID 1562 being 120*c* (such as an air-conditioner in the living room) include users having 501*a*, 501*b*, and 501*c* as the user ID 1563. The users operating the device 120 with the device ID 1562 being 120*d* (such as an air-conditioner in the child's room) include users having 501*b* and 501*c* as the user ID 1563.

When the no-response notification is received from the response detector 207, a "temporary" cell may not be present at the column of the control right 514 in the control right information 500 managed by the control right manager 205 with respect to the device 120. The control right updater 1411 identifies the user ID of the user temporarily granted the remote control right to the device 120 based on a predetermined algorithm (hereinafter referred to as a modification algorithm) different from the predetermined algorithm used by the control right updater 211 of the first embodiment. The control right updater 1411 updates the control right information 500 by adding a row including a "temporary" cell at the column of the control right 514 with respect to the identified user.

The modification algorithm identifies the user temporarily granted the remote control right to the device 120 using the operation log table 1550 stored on the operation log memory 1412.

The modification algorithm is described further.

When the control right updater 1411 receives the no-response notification from the response detector 207, a "temporary" cell may not be present at the column of the control right 514 in the control right information 500 managed by the control right manager 205 with respect to the device 120. The control right updater 1411 references the operation log table 1550 stored on the operation log memory 1412 and identifies the device 120 which has been operated by the user granted the "standard" remote control right to the device 120 (hereinafter referred to as a "past operation target device 120"). The control right updater 1411 identifiers the user IDs 1563 of all users who have operated the past operation target device 120 identified, and identifies as an identifier of a user temporarily granted the remote control right the user ID 1563 of the user other than the user granted the "standard" remote control right from among the user IDs 1563.

For example, the identifier of the user temporarily granted the remote control right is identified as described below. The device ID of the device 120 may now be 120*a*, the control right information managed by the control right manager 205 may be the original control right information 500*b* of FIG. 5B, and the operation log table stored on the operation log memory 1412 may be the operation log table 1550 of FIG. 15B. In such a case, the devices having 120*a*, 120*c*, and 120*d* having the device IDs are identified as the devices 120 that have been remote controlled by the users granted the "standard" remote control right to the device 120 (the device having 120*a* as the device ID) (users having 501*a* and 501*b* as the user IDs). The user IDs of all users who have operated the identified devices are identified as 501*a*, 501*b*, and 501*c*. From among the identified users, the user ID 501*c* of the user other than the user granted the "standard" remote control right is thus identified as the identifier identifying the user temporarily granted the remote control right.

The operation of the modified remote control system thus constructed is described with the drawings.

Operation

The modified remote control system performs a notification process having part thereof of modified from the notification process of (see FIG. 12) of the first embodiment.

The modified notification process is described below.

Figure 16:
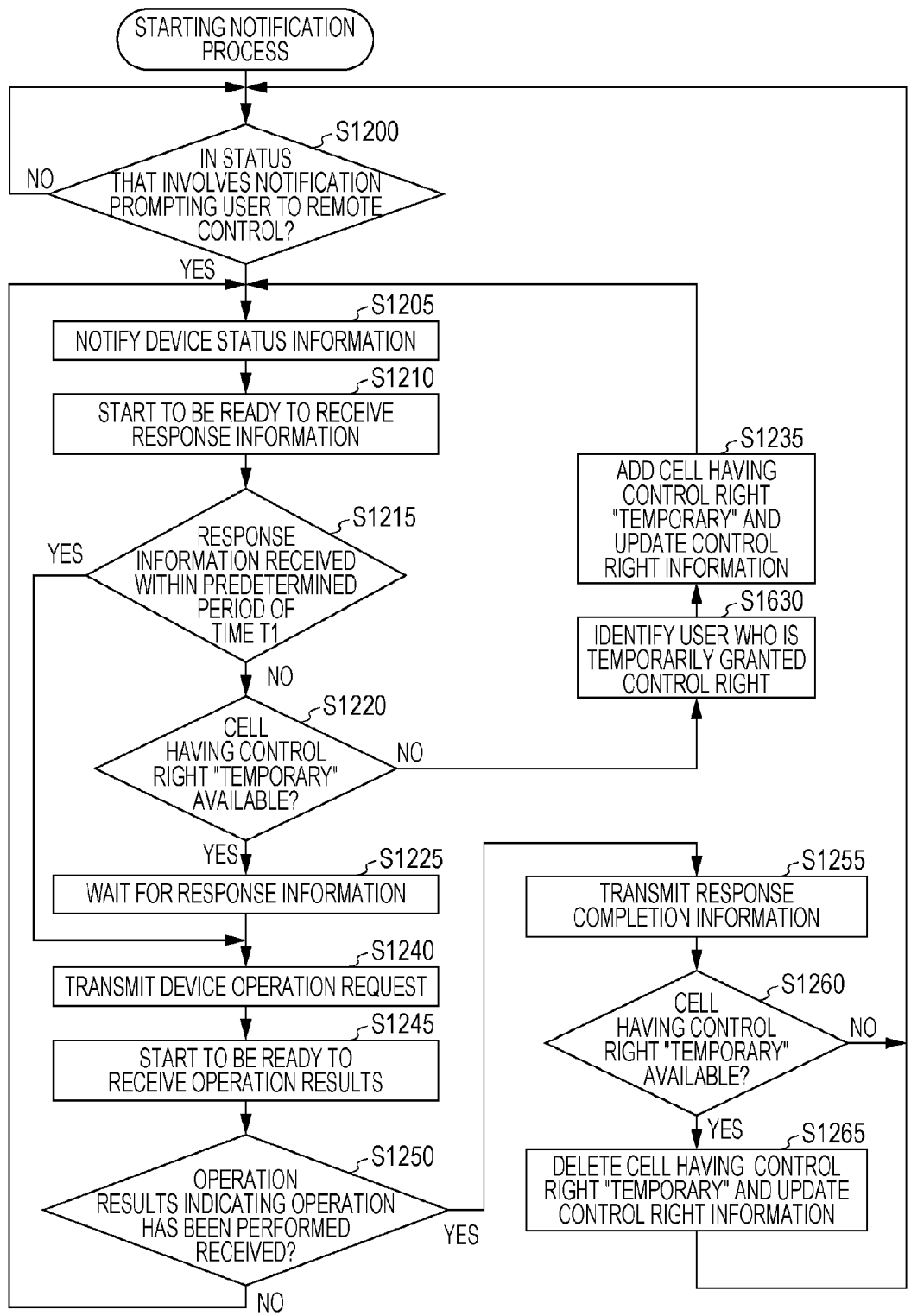
FIG. 16 is a flowchart illustrating a modified notification process.

FIG. 16 is a flowchart illustrating of the modified notification process.

As illustrated in FIG. 16, the modified notification process includes step S1630, which is a replacement for step S1230 in the notification process of the first embodiment. The following discussion focuses on the operation in step S1630.

If the column of the control right 514 includes no "temporary" cell on the device 120 in the operation in step S1220 (no branch from step S1220), the control right updater 211 references the operation log table 1550 stored on the operation log memory 1412, and identifies the past operation target device 120 which the user granted the "standard" remote control right has remote controlled. The operation log memory 1412 identifies the user IDs 1563 of all users who have remote controlled the identified past operation target device 120, and then identifies as an identifier identifying the user temporarily granted the remote control right as the user ID 1563 of the user other than the user granted the "standard" remote control right, from among the identified user IDs 1563.

The modified notification process proceeds to step S1235 subsequent to step S1630.

Based on the past operation log of each device 120 forming the modified remote control system, the modified remote control system finds a user who is estimated to be close to the user granted the "standard" remote control right on the device 120, and temporarily grants the remote control right to the found user.

The user temporarily granted the remote control right is identified without registering grouping information of users in advance, such as the family user information 900 in the first embodiment.

Annexes

The remote control system has been described with reference to the first and second embodiments to implement the remote control method of the disclosure. The disclosure may be modified as described below, and is not limited to the remote control method implemented by the remote control system described with reference to the first and second embodiments.

In the first embodiment, the remote control system 100 is configured such that the device 120 is connected to the Internet 141 via the gateway 142. As long as the device 120 is connected to the network 140, the remote control system 100 is not limited to the configuration that the device 120 is connected to the Internet 141 via the gateway 142. In another configuration, the device 120 may be directly connected to the Internet 141.

In the remote control system 100 of the first embodiment, the device management server 110 includes as elements related to the status determination of the device 120, the status log memory 202, the device information manager 203, and the status determiner 204, as elements related to the status notification of the device 120, the device status information transmitter 206 and the response completion information transmitter 210, as elements related to the management and updating of the control right of the device 120, the control right manager 205, the response detector 207, the control right updater 211, and the family user memory 212. These elements may be implemented in the remote control system 100, and may not necessarily have to be included in the device management server 110. In yet another example, part or whole of the elements may be an element in the gateway 142 or the device 120.

If the determination in step S1220 is affirmative (see FIG. 12) in the remote control system 100 of the first embodiment, the response detector 207 further continues to wait to receive the response information 700 (step S1225).

If the response detector 207 continues to receive but is still unable to receive the response information 700 even after a predetermined period of time T2 (such as 30 minutes) in step S1225, a predetermined process may be performed or the response detector 207 may wait until the response information 700 is received. An example of the predetermined process may include generating a device request operation corresponding to the recommended response operation 614 of the device status information 600, transmitting the device request operation to the device 120, and proceeding to step S1245.

If the determination in step S1250 is not affirmative (see FIG. 12) in the remote control system 100 of the first embodiment, the device status information transmitter 206 updates the device status information 600 to cause the response status 617 to be "aborted", and the device status information transmitter 206 transmits to each mobile terminal 130 the device status information 600 with the response status 617 being "aborted".

In this case, the mobile terminal 130 having received the device status information 600 with the response status 617 being "aborted" may cause the device 120 to display an indication that the execution of the requested operation is aborted.

In the second embodiment, the modified remote control system provides the method of identifying the user ID of the user temporarily granting the remote control right. In the method, the modified remote control system identifies as the user ID of the user temporarily granting the remote control right the user ID of the user other than the user granted the "standard" remote control right, from among the user IDs of all users who have operated the device which has been remote operated by the user granted the "standard" remote control right.

This is an example in which the user ID of the user temporarily granted the remote control right is identified based on the history of past remote control.

A variety of methods are contemplated to identify the user temporarily granted the remote control right based on the history of past remote control.

As one example, the user ID of the user other than the user granted the "standard" remote control right is identified as the user ID of the user the user temporarily granted the remote control right, from among the user IDs of all the users who remote controlled the device 120 in the past.

The remote control system 100 of the first embodiment allows the two types of remote control rights to the device 120, namely, the "standard" remote control right that permits all remote control operations to be performed on the target device 120 and the "temporary" remote control right that permits part of the remote control operations to be performed on the device 120. In the method of identifying the user ID of the user temporarily granted the remote control right to a recommended operation, the family user ID 911 of the user other than the user granted the "standard" remote control right is identified as the user ID of the user temporarily granted the remote control right from among the family user IDs 911 associated with the user ID of the user granted the "standard" remote control right in the family user information 900 stored on the family user memory 212. These users are thus temporarily granted the control right.

In yet another configuration, the three types of remote control rights to the device 120 includes the "standard" remote control right that permits all remote control operations to be performed on the target device 120, a "first limited right" having part of the remote control right including the recommended operation from among all the remote control operations enabled on the target device 120, and a "second limited right" having a remote control right more limited than the first limited right and having no right to the recommended operation. In the method of identifying the user ID of the user temporarily granted the remote control right to the recommended operation, the user ID of the user granted the "second limited right" is identified as the user ID of the user temporarily granted the remote control right to the recommended operation, and the user granted the "second limited right" is temporarily granted the "first limited right".

The embodiments and modifications may be combined.

The remote control method and the remote control system of the disclosure are further described in terms of configuration, modification, and advantages.

According an aspect of the disclosure, a remote control method remote controls a target device connected to a network in a system by using a mobile terminal. The remote control method includes acquiring, from the target device, status information indicating a use state of the target device, deciding to transmit recommendation information prompting a user to switch the target device in the use state from a first use state to a second use state to a first mobile terminal to be used by a first user who is granted a remote control right to the target device from among a plurality of users, based on the status information, and a database storing association information indicating an association between the users and mobile terminals respectively used by the users, and right information that indicates for each of the users whether the user is granted the remote control right to the target device, transmitting the recommendation information to the first mobile terminal, determining whether the target device is switched in the use state from the first use state after the recommendation information is transmitted to the first mobile terminal, updating the database such that the remote control right to a second user who has not been granted the remote control right from among the users is granted if the first use state is determined to remain unchanged for a predetermined period of time from the transmission of the recommendation information to the first mobile terminal, deciding to transmit the recommendation information to a second mobile terminal used by the second user in accordance with the updated database, and transmitting the recommendation information to the second mobile terminal.

In accordance with the remote control method of the embodiment of the disclosure, the recommendation information is transmitted to the first mobile terminal used by the first user granted the remote control right to the target device in advance. If the target device remains in the first use state for a predetermined period or more, the second user is newly granted the remote control right to the target device, and the recommendation information is transmitted to the second mobile terminal use by the second user.

In this configuration, instead of the first user, the second user may respond to the use state of the device if no response performed on the use state of the device detected by the device even after the elapse of the predetermined period of time or longer from the transmission of the recommendation information to the first user.

In this way, besides the first user, the second user may respond to the use state of the device even if no response is performed on the use state of the device detected by the device regardless of the time elapse of the predetermined period of time from the transmission of the recommendation information to the first user.

The remote control method thus reduces the possibility that a response that is to be performed to the use state detected by the device is delayed.

The database may be further updated by revoking the remote control right granted to the second user if the status information acquired subsequent to the transmission of the recommendation information to the second mobile terminal indicates a use state other than the first use state.

In this configuration, the granting of the remote control right to the second user is limited to a period of time until the target device is in a use state other than the first use state.

The remote control method may further include transmitting, to the first mobile terminal, response completion information indicating that the target device is switched into the second use state if first status information acquired subsequent to the transmission of the recommendation information to the first mobile terminal indicates the second use state, and transmitting the response completion information to the first mobile terminal and the second mobile terminal if second status information acquired subsequent to the transmission of the recommendation information to the second mobile terminal indicates the second use state.

If the target device shifts into the second use state after the transmission of the recommendation information to the first mobile terminal in this configuration, the first user is notified that the target device shifts into the second use state. If the target device shifts into the second use state after the transmission of the recommendation information to the second mobile terminal, the first user and the second user are notified that the target device shifts into the second use state.

The remote control method may further include transmitting, to the first mobile terminal, status switch information indicating that the target device is switched into a third use state if first status information acquired subsequent to the transmission of the recommendation information to the first mobile terminal indicates the third use state.

If the target device is switched into the third use state after the transmission of the recommendation information to the first mobile terminal in this configuration, the first user is notified that the target device is switched into the third use state.

The deciding to transmit the recommendation information to the first mobile terminal with the acquired status information indicating that the target device has been in the first use state for a predetermined period of time or longer may be performed if the first use state indicates that the target device is powered on.

In this configuration, the transmission of the recommendation information is triggered when the continuous power-on of the target device is detected.

The deciding to transmit the recommendation information to the first mobile terminal with the acquired status information indicating that the target device has been in the first use state for a predetermined period of time or longer is performed if the first use state indicates that the target device is powered on, and that no person is present within a predetermined range from the target device.

In this configuration, the transmission of the recommendation information is triggered when the continuous power-on of the target device is detected, and that no person is detected within a predetermined range from the target device.

The remote control method may further include, with the database managing family information related to family members including the first user, selecting the second user as a user to be granted the remote control right using the database from the family members other than the first user.

The second user may thus be selected from the family members of the first user.

The remote control method may further include, with the database storing an operation log indicating a user who has operated the target device, selecting the second user as a user to be granted the remote control right using the database from the users who have operated the target device, other than the first user.

In this configuration, the second user may be selected from the users who have operated the target device.

The remote control method may further include, with the database storing an operation log indicating a user who has operated a plurality of devices including the target device, selecting the second user as a user to be granted the remote control right using the database from the users who have operated a device with the remote control right thereof granted to the first user, other than the first user.

In this configuration, the second user may be selected from the users who have operated the device whose remote control right is granted to the first user.

The remote control method may further include, with the recommendation information including first recommendation information and second recommendation information different from the first recommendation information, the first recommendation information and/or the second recommendation information including first operation information indicating a first user operation to switch the target device from the first use state to the second use state, transmitting the first recommendation information to the first mobile terminal, causing the first mobile terminal to display the transmitted first recommendation information on the first mobile terminal, transmitting the second recommendation information to the second mobile terminal, and causing the second mobile terminal to display the transmitted second recommendation information on the second mobile terminal.

In this configuration, the recommendation information to be notified to the first user may be set to be different from the recommendation information to be notified to the second user.

The remote control method may further include, with the first operation information including operation information to power off the target device, and with the first mobile terminal including a graphical interface to receive a user operation, causing the first mobile terminal to display, on at least the graphical interface of the first mobile terminal, as the first operation information an icon to receive from a user an operation to power off the target device.

If the recommended operation is an operation to power off, the first user may relatively easily perform the operation to power off.

The remote control method may further include, with the first operation information including operation information to power on the target device, and with the first mobile terminal including a graphical interface to receive a user operation, causing the first mobile terminal to display, on at least the graphical interface of the first mobile terminal, as the first operation information an icon to receive from a user an operation to power on the target device.

If the recommended operation is an operation to power off, the first user may relatively easily perform the operation to power off.

The remote control right may include a first right and a second right that is narrower in coverage than the first right. The first user is granted the first right. The first recommendation information includes first right information indicating the first right and second operation information indicating a second user operation to the target device other than the first user operation.

The recommendation information to be transmitted to the first user may thus include information indicating an operation other than the operation to switch the target device from the first use state to the second use state.

The remote control method may further include causing the first mobile terminal to display on the first mobile terminal a first icon to receive the first user operation as the first operation information and a second icon to receive the second user operation as the second operation information.

In this configuration, the icon to receive the first user operation and the icon to receive the second user operation may be displayed on the first mobile terminal.

The second user may be granted the second right, and the second recommendation information may further include second right information indicating the second right.

In this configuration, the remote control right granted to the second user may be set to be narrower in right than the remote control right granted to the first user.

The first icon may be displayed on the second mobile terminal, and the second icon may not be displayed on the second mobile terminal.

In this configuration, the first icon is displayed on the second mobile terminal while the second icon is not displayed on the second mobile terminal.

The first recommendation information may include first use status information indicating the first use state, and the first use status information may be displayed on the first mobile terminal.

In this configuration, the first use status information is displayed on the first mobile terminal.

The second recommendation information may include first use status information indicating the first use state, and the first use status information may be displayed on the second mobile terminal.

In this configuration, the first use status information may be displayed on the second mobile terminal.

The remote control method may further include, with the database storing an operation log indicating a user who has operated the target device, identifying, using the database, a user who has responded to switch the target device to the second use state, with the response completion information including executing user information indicating the identified user, causing the first mobile terminal to display the executing user information on the first mobile terminal, and causing the second mobile terminal to display the executing user information on the second mobile terminal if the response completion information is transmitted to the second mobile terminal.

In this configuration, the user having performed an operation to switch the target device into the second use state is displayed on the first mobile terminal. If the completion information is transmitted to the second mobile terminal, the user who has performed an operation to switch the target device into the second use state may also be displayed on the second mobile terminal.

A member not granted the remote control right may be selected as the second user from among the family members.

In this configuration, the second user may be selected from the family members of the first user, not granted the remote control right.

The remote control method may further include, with the database further storing an operation log indicating a user who has operated the target device, acquiring first status information at a first time subsequent to the transmission of the recommendation information to the first mobile terminal, determining that an operation to switch the operation state has been successful if the first status information indicates the second use state, and a first operation log responsive to the first time indicates that the operation to switch the operation state has been performed by the first user, transmitting, to the first mobile terminal, success information indicating that the operation to switch the operation state has been successful, determining that the operation to switch the operation state has been aborted if the first status information indicates the first use state, and the first operation log responsive to the first time indicates that the operation to switch the operation state has been performed by the first user, and transmitting, to the first mobile terminal, abortion information that the operation to switch the operation state has been aborted.

In response to the determination results of the operation performed by the first user, the results may be fed back to the first user.

A remote control system of one aspect of the disclosure controls a target device connected to a network using a mobile terminal. The remote control system includes one or more memories, and circuitry, which in operation acquires, from the target device, status information indicating a use state of the target device, decides to transmit recommendation information prompting a user to switch the target device in the use state from a first use state to a second use state to a first mobile terminal to be used by a first user who is granted a remote control right to the target device from among a plurality of users, based on the status information, and a database storing association information indicating an association between the users and mobile terminals respectively used by the users, and right information that indicates for each of the users whether the user is granted a remote control right to the target device, transmits the recommendation information to the first mobile terminal, determines whether the target device is switched in the use state from the first use state after the recommendation information is transmitted to the first mobile terminal, updates the database such that the remote control right to a second user who has not been granted the remote control right from among the users is granted if the first use state is determined to remain unchanged for a predetermined period of time from the transmission of the recommendation information to the first mobile terminal, decides to transmit the recommendation information to a second mobile terminal used by the second user in accordance with the updated database, and transmits the recommendation information to the second mobile terminal.

In the remote control system of one aspect of the disclosure, the recommendation information may be transmitted to the first mobile terminal used by the first user who is granted the remote control right in advance. If the target device remains in the first use state for a predetermined period of time, the second user is newly granted the remote control right. The recommendation information is transmitted to the second mobile terminal used by the second user.

If no response has not been performed on the use state of the device detected by the device for the predetermined period of time subsequent to the transmission of the recommendation information to the first user, besides the first user, the second user may respond to the use state of the device.

The remote control system thus reduces the possibility that the response to the use state of the device detected by the device is delayed.

The remote control method, and the remote control system of the disclosure find widespread applications in a system to control a device.

What is claimed is:

1. A remote control method that remotely controls a target device connected to a network in a system by using a mobile terminal, comprising:
   acquiring, from the target device, status information indicating a use state of the target device;
   deciding to transmit recommendation information that prompts a granted user to switch the target device in the use state from a first use state to a second use state when the use state of the target device indicates that the target device has been in the first use state for a first predetermined period of time or longer;
   selecting a first user, from a plurality of users, as the granted user based on remote control rights information stored on a database, the remote control rights information indicating whether each of the plurality of the users is granted a remote control right to remotely control the target device;
   transmitting the recommendation information to the first mobile terminal used by the first user based on association information between the plurality of the users and mobile terminals respectively used by the users, the association information further stored on the database;
   determining whether the target device is switched from the first use state to the second use state after the recommendation information is transmitted to the first mobile terminal;
   updating the remote control rights information stored on the database such that a second user included in the users who has not been granted a remote control right of the target device is newly selected as the granted user to replace the first user as the granted user when the first use state is determined to remain unchanged for a second predetermined period of time from the transmission of the recommendation information to the first mobile terminal;
   deciding to transmit the recommendation information to a second mobile terminal used by the second user in accordance with the updated remote control rights information stored on the database; and
   transmitting the recommendation information to the second mobile terminal.

2. The remote control method according to claim 1, wherein the remote control rights information stored on the database is further updated to indicate that the remote control right granted to the second user is revoked when the status information acquired subsequent to the transmission of the recommendation information to the second mobile terminal indicates a use state other than the first use state.

3. The remote control method according to claim 1, further comprising:
transmitting, to the first mobile terminal, response completion information indicating that the target device is switched to the second use state when first status information acquired subsequent to the transmission of the recommendation information to the first mobile terminal indicates the second use state; and
transmitting the response completion information to the first mobile terminal and the second mobile terminal when second status information acquired subsequent to the transmission of the recommendation information to the second mobile terminal indicates the second use state.

4. The remote control method according to claim 1, further comprising transmitting, to the first mobile terminal, status switch information indicating that the target device is switched to a third use state when first status information acquired subsequent to the transmission of the recommendation information to the first mobile terminal indicates the third use state.

5. The remote control method according to claim 1, wherein the first use state indicates that the target device is powered on.

6. The remote control method according to claim 1, wherein the first use state indicates that the target device is powered on, and that no person is present within a predetermined range from the target device.

7. The remote control method according to claim 1, wherein the database stores family information related to family members including the first user,
the method, further comprising:
selecting the second user as a user to be granted a remote control right of the target device using the family information, the second user being selected from among the family members other than the first user based on the family information.

8. The remote control method according to claim 1, wherein the database stores an operation log indicating a user who has operated the target device,
the method, further comprising:
selecting the second user as a user to be granted a remote control right of the target device using the operation log stored on the database, the second user being selected from among the users who have operated the target device other than the first user based on the operation log.

9. The remote control method according to claim 1, wherein the database stores an operation log indicating a user who has operated a plurality of devices including the target device,
the method, further comprising:
selecting the second user as a user to be granted a remote control right of the target device using the operation log stored on the database, the second user being selected from among the users who have operated a device other than the first user who has been granted a remote control right based on the operation log.

10. The remote control method according to claim 1, wherein the recommendation information includes first recommendation information and second recommendation information different from the first recommendation information, the first recommendation information and/or the second recommendation information including first operation information indicating a first user operation to switch the target device from the first use state to the second use state,
the method, further comprising:
transmitting the first recommendation information to the first mobile terminal;
causing the first mobile terminal to display the transmitted first recommendation information on the first mobile terminal;
transmitting the second recommendation information to the second mobile terminal; and
causing the second mobile terminal to display the transmitted second recommendation information on the second mobile terminal.

11. The remote control method according to claim 10, wherein the first operation information includes operation information to power off the target device, and the first mobile terminal includes a graphical interface to receive a user operation,
the method, further comprising:
causing the first mobile terminal to display, on at least the graphical interface of the first mobile terminal, as the first operation information an icon to receive from a user an operation to power off the target device.

12. The remote control method according to claim 10, wherein the first operation information includes operation information to power on the target device, and the first mobile terminal includes a graphical interface to receive a user operation,
the method, further comprising:
causing the first mobile terminal to display, on at least the graphical interface of the first mobile terminal, as the first operation information an icon to receive from a user an operation to power on the target device.

13. The remote control method according to claim 10, wherein the remote control right includes a first remote control right and a second remote control right that is narrower in coverage than the first remote control right,
wherein the first user is granted the first remote control right, and
wherein the first recommendation information includes first remote control right information indicating the first remote control right and second operation information indicating a second user operation to the target device other than the first user operation.

14. The remote control method according to claim 13, further comprising causing the first mobile terminal to display, on the first mobile terminal, a first icon to receive the first user operation as the first operation information and a second icon to receive the second user operation as the second operation information.

15. The remote control method according to claim 13, wherein the second user is granted the second remote control right, and
wherein the second recommendation information further includes second remote control right information indicating the second remote control right.

16. The remote control method according to claim 15, wherein the first icon is displayed on the second mobile terminal, and
wherein the second icon is not displayed on the second mobile terminal.

17. The remote control method according to claim 10, wherein the first recommendation information includes first use status information indicating the first use state, and wherein the first use status information is displayed on the first mobile terminal.

18. The remote control method according to claim 10, wherein the second recommendation information includes first use status information indicating the first use state, and
wherein the first use status information is displayed on the second mobile terminal.

19. The remote control method according to claim 3,
wherein the database stores an operation log indicating a user who has operated the target device,
wherein a user who has responded to switch the target device to the second use state is identified using the operation log, and
wherein the response completion information includes executing user information that indicates the identified user,
the method, further comprising:
displaying, on the first mobile terminal, the executing user information; and
causing the second mobile terminal to display the executing user information on the second mobile terminal when the response completion information is transmitted to the second mobile terminal.

20. The remote control method according to claim 7, wherein a member that is not granted a remote control right to remotely control the target device is selected as the second user from among the family members.

21. The remote control method according to claim 1,
wherein the database further stores an operation log that indicates a user who has operated the target device,
the method further comprising:
acquiring status information at a time subsequent to the transmission of the recommendation information to the first mobile terminal;
determining that an operation to switch the use state has been successful when the status information indicates the second use state, and an operation log responsive to the time subsequent to the transmission indicates that the operation to switch the use state has been performed by the first user;
transmitting, to the first mobile terminal, success information indicating that the operation to switch the use state has been successful;
determining that the operation to switch the use state has been aborted when the status information indicates the first use state, and the operation log responsive to the time subsequent to the transmission indicates that the operation to switch the use state has been performed by the first user; and
transmitting, to the first mobile terminal, abortion information that the operation to switch the use state has been aborted.

22. A remote control system that remotely controls a target device connected to a network using a mobile terminal, comprising one or more memories, and circuitry, which in operation:
acquires, from the target device, status information indicating a use state of the target device;
decides to transmit recommendation information that prompts a granted user to switch the target device in the use state from a first use state to a second use state when the use state of the target device indicates that the target device has been in the first use state for a first predetermined period of time or longer;
selecting a first user, from a plurality of users, as the granted user based on remote control rights information stored on a database, the remote control rights information indicating whether each of the plurality of the users is granted a remote control right to remotely control of the target device;
transmits the recommendation information to the first mobile terminal used by the first user based on association information between the plurality of the users and mobile terminals respectively used by the users, the association information further stored on the database;
determines whether the target device is switched from the first use state to the second use state after the recommendation information is transmitted to the first mobile terminal;
updates the remote control rights information stored on the database such that a second user included in the users who has not been granted a remote control right of the target device is newly selected as the granted user to replace the first user as the granted user when the first use state is determined to remain unchanged for a second predetermined period of time from the transmission of the recommendation information to the first mobile terminal;
decides to transmit the recommendation information to a second mobile terminal used by the second user in accordance with the updated remote control rights information stored on the database; and
transmits the recommendation information to the second mobile terminal.

* * * * *